(12) United States Patent
Enomoto et al.

(10) Patent No.: US 7,754,595 B2
(45) Date of Patent: Jul. 13, 2010

(54) METHOD FOR MANUFACTURING SEMICONDUCTOR DEVICE

(75) Inventors: Hiroyuki Enomoto, Musashino (JP); Shoichi Uno, Fussa (JP); Seiko Ishihara, Oume (JP); Takashi Yahata, Oume (JP)

(73) Assignee: Hitachi, Ltd., Tokyo (JP)

( * ) Notice: Subject to any disclaimer, the term of this patent is extended or adjusted under 35 U.S.C. 154(b) by 195 days.

(21) Appl. No.: 11/768,061

(22) Filed: Jun. 25, 2007

(65) Prior Publication Data

US 2008/0003770 A1 Jan. 3, 2008

(30) Foreign Application Priority Data

Jun. 30, 2006 (JP) .............................. 2006-180711

(51) Int. Cl.
*H01L 21/44* (2006.01)
(52) U.S. Cl. ..................... 438/597; 438/396; 438/411; 257/E21.008; 257/E21.268; 257/E29.276
(58) Field of Classification Search ................ 438/411, 438/597, 396; 257/344, 336, E21.008, E21.268, 257/E21.438, E29.276, E29.282
See application file for complete search history.

(56) References Cited

U.S. PATENT DOCUMENTS

| | | | | |
|---|---|---|---|---|
| 5,436,411 A | * | 7/1995 | Pasch | ........................ 174/261 |
| 6,271,620 B1 | | 8/2001 | Ladabaum | |
| 6,320,239 B1 | | 11/2001 | Eccardt et al. | |
| 6,562,650 B2 | | 5/2003 | Ladabaum | |
| 6,571,445 B2 | | 6/2003 | Ladabaum | |
| 6,803,601 B2 | * | 10/2004 | Nakajima | ..................... 257/59 |
| 2003/0038320 A1 | * | 2/2003 | Yamada et al. | .............. 257/344 |
| 2003/0235969 A1 | * | 12/2003 | Yokota | ........................ 438/396 |
| 2005/0051842 A1 | * | 3/2005 | Liou et al. | ..................... 257/347 |
| 2006/0141758 A1 | * | 6/2006 | Naumann et al. | ............ 438/597 |
| 2006/0154493 A1 | * | 7/2006 | Arghavani et al. | .......... 438/786 |

FOREIGN PATENT DOCUMENTS

| | | |
|---|---|---|
| JP | 5-6849 A | 1/1993 |
| JP | 2004-71767 A | 3/2004 |

OTHER PUBLICATIONS

J. Knight et al., "Fabrication and Characterization of cMUTs for Forward Looking Intravascular Ultrasound Imaging," 2003 IEEE Ultrasoncis Symposium, 2003, pp. 577-580.

* cited by examiner

*Primary Examiner*—Charles D Garber
*Assistant Examiner*—Abdulfattah Mustapha
(74) *Attorney, Agent, or Firm*—Miles & Stockbridge P.C.

(57) ABSTRACT

An insulating film on a semiconductor substrate has a first titanium nitride film, an aluminum film, and a second titanium nitride film formed thereon, and an insulating film is formed so as to cover a lower electrode wiring. Then, the insulating film is dry-etched anisotropically so that the insulating film on the lower electrode wiring is removed, and a portion of the insulating film on the lower electrode wiring is left as a sidewall. A deposit deposited during the etching of the insulating film on the lower electrode wiring is removed by radical etching without using ion bombardment. The deposit contains Ti that is a metal element forming the second titanium nitride film. Subsequently, the second titanium nitride film is nitrided through ammonium plasma, and an insulating film to cover the lower electrode wiring is formed.

19 Claims, 18 Drawing Sheets

METHOD FOR MANUFACTURING SEMICONDUCTOR DEVICE

CROSS-REFERENCE TO RELATED APPLICATION

The present application claims priority from Japanese Patent Application No. JP 2006-180711 filed on Jun. 30, 2006, the content of which is hereby incorporated by reference into this application.

TECHNICAL FIELD OF THE INVENTION

The present invention relates to a method for manufacturing a semiconductor device. In particular, it relates to a technology effectively applied to a method for manufacturing an ultrasonic sensor which is manufactured in accordance with the MEMS (micro electro mechanical system) technology.

BACKGROUND OF THE INVENTION

Ultrasonic sensors are put to practical use in various kinds of apparatus including, for example, an ultrasonic diagnosing apparatus for medical use and an ultrasonic flow detector for non-destructive inspection.

Though so far the mainstream of ultrasonic sensors has been those utilizing oscillation of a piezoelectric body, the development of an ultrasonic sensor of capacitance-detection type using the MEMS technology has been progressing as a result of advancements in the MEMS technology in recent years.

This ultrasonic sensor of capacitance-detection type has an oscillator formed on a semiconductor substrate with electrodes facing each other having a cavity portion therebetween. In this sensor, a membrane oscillates in the vicinity of a resonant frequency when a voltage of a direct current or an alternating current is applied and superimposed to the respective electrodes, thereby generating ultrasonic waves. By applying this principal and modifying the structure of the above described electrodes, a 1.5 dimensional array of short-axis variable focus and a two-dimensional array of real time 3D imaging compatible have been researched and developed.

A technology concerning such an ultrasonic sensor is described in U.S. Pat. No. 6,320,239 B1 (Patent Document 1) for example, and a capacitance-detection type ultrasonic transducer using a silicon substrate as the lower (bottom) electrode is disclosed therein.

In addition, there is also disclosed a capacitance-detection type ultrasonic transducer having a structure which is formed on patterned bottom electrodes (e.g., in U.S. Pat. No. 6,271,620 B1 (Patent Document 2) and "2003 IEEE ULTRASONICS SYMPOSIUM" (U.S.) 2003, pp. 577-580 (Non-Patent Document 1)).

In addition, for example, U.S. Pat. No. 6,571,445 B2 (Patent Document 3) and U.S. Pat. No. 6,562,650 B2 (Patent Document 4) disclose technologies for forming an ultrasonic transducer of capacitance-detection type on the upper layer of a signal processing circuit formed on a silicon substrate. (Also refer to Japanese Patent Application Laid-Open Publication No. 5-6849 (Patent Document 5) and Japanese Patent Application Laid-Open Publication No. 2004-071767 (Patent Document 6))

SUMMARY OF THE INVENTION

According to a study of the inventors of the present invention, the following was found.

The ultrasonic sensor studied by the inventors of the present invention is an ultrasonic sensor of capacitance detection type using the MEMS technology. A plurality of ultrasonic sensor cells (oscillators) are placed densely in honeycomb form on a main surface of a semiconductor chip constructing the ultrasonic sensor.

Each ultrasonic sensor cell has a cell configuration of capacitance-detection type having a first electrode formed on the main surface of the semiconductor chip and a second electrode placed above the first electrode so as to face this first electrode via a cavity portion.

In a ultrasonic sensor of capacitance detection type in a one-dimensional array, it is sufficient when only one electrode of a electrostatic variable capacitor is separated between channels, and thus, a system can be used where a silicon substrate is used as a common electrode, an electrode wiring on a long-axis side (upper electrode wiring) is placed on the silicon substrate via a cavity region and the electrode wiring on the long axis side (upper electrode wiring) of the upper portion of this cavity is divided for channels.

In an ultrasonic sensor of capacitance detection type in a 1.5 or higher dimensional array, however, it becomes necessary to control the other electrode (electrode on the short axis side) of the electrostatic variable capacitor in a divided manner. Therefore, in the case where the silicon substrate is used as the lower electrode (electrode on the short axis side), the silicon substrate must be divided. As for the means for dividing the silicon substrate, though there is a method for using, for example, an SOI (silicon on insulator) substrate which is divided by U-shaped trenches, a problem arises where the process is complicated and the manufacturing cost increases. In addition, when taking into consideration mixed mounting of a selection switch, a sense amplifier and the like into the oscillator array as a developed form of oscillator array elements, there is an advantage in the case where the selection switch, the sense amplifier and the like can be independently designed in the process when the oscillator array can be completely manufactured only in a semiconductor wiring process, so that the mixed mounting becomes easy.

Therefore, the inventors of the present invention adopted aluminum wiring, which is generally used in the semiconductor process, and studied a process for forming an electrostatic variable capacitor element formed by a lower electrode wiring and an upper electrode wiring made of aluminum. When the electrostatic variable capacitor element is formed by a lower electrode wiring and an upper electrode wiring made of aluminum formed on a semiconductor substrate, the lower electrode wiring and the upper electrode wiring can be formed in a relatively simple manufacturing process, and it becomes possible to respectively divide the lower electrode wiring and the upper electrode wiring into a plurality of channels and control them, and thus, a 1.5 dimensional array and a two dimensional array, in addition to a one-dimensional oscillator array, can be easily achieved. In addition, it becomes easy to mixed mount other semiconductor elements, for example, such as a selection switch and a sense amplifier, into the same semiconductor substrate (i.e., in the same semiconductor chip).

When an aluminum wiring is used as the lower electrode wiring, however, the upper electrode wiring which crosses this lower electrode wiring at a right angle is in a form which straddles a step formed by the lower electrode wiring, and therefore, various problems arise. That is to say, it becomes difficult to form a stable electrostatic variable capacitor having desired insulating properties in a vertical step portion of the lower electrode wiring because: 1) the deposition coverage of the insulating film formed between the lower electrode wiring and the upper electrode wiring is insufficient, and there is a possibility that short-circuiting or leakage may be induced; 2) a sacrificial pattern for creating a cavity cannot be removed, which may cause peeling of the pattern; and 3) there is a possibility that the upper electrode wiring itself may be disconnected, and so forth. As a result of these problems, the reliability of the capacitance detection type ultrasonic sensor is lowered, and the manufacturing yield is also lowered.

In order to avoid the above described problems, for example, a method where an SOG (spin on glass) film, an HDP (height density plasma) oxide film or the like is formed, and after that, planarizing the film through CMP (chemical mechanical polishing) is possible as the method for reducing the height of the vertical step of the lower electrode wiring. However, the capacitance varies depending on the film thickness of the remaining insulating film on the lower electrode wiring, and therefore, it is not preferable to leave an insulating film on the upper surface of the lower electrode wiring after planarizing through CMP, taking controllability of the capacitance value into consideration. Therefore, in the case where CMP is used, it is desired to completely remove the insulating film on the lower electrode wiring through CMP and stop polishing selectively on the upper surface of the lower electrode wiring. And in such a case, it is found that problems arise such that the surface of the lower electrode wiring is scratched and dishing occurs in portions where there is no lower electrode wirings, and so the manufacturing with high precision is difficult.

Though there is also a method using a Damascene wiring process as another method for reducing the height of the vertical step of the lower electrode wiring, the manufacturing cost increases, and in addition, the width between the lower electrode wirings is several hundred μm in the present device, and therefore, the prevention of dishing is extremely difficult and it makes practicability low.

Based on the above, the inventors of the present invention considered that it would be effective to form an insulating film so that the lower electrode wiring is covered and to etch and remove the insulating film until the surface of the lower electrode wiring is exposed in order to reduce the height of the vertical step of the lower electrode wiring. Accordingly, the insulating film on the upper surface of the lower electrode wiring is removed, and the insulating film is left between adjacent lower electrode wirings so that the height of the vertical step of the lower electrode wiring can be reduced without causing scratching on the surface of the lower electrode wiring or the dishing problem in portions where there is no lower electrode wiring, unlike when using CMP.

Meanwhile, it was found according to the study by the inventors of the present invention that when an insulating film is formed so as to cover the lower electrode wiring, and this insulating film is etched until the surface of the lower electrode wiring is exposed, a titanium nitride film on the surface of the lower electrode wiring is shaved as a result of over-etching and so a deposit made of a titanium-based reaction product is deposited on the surface of the wafer. It was found that problems arise such that this deposit made of a titanium-based reaction product contains a metal element, such as titanium, and therefore, the deposit forms a leakage path, thus increasing the leakage current between wirings. And furthermore, it deteriorates the withstand voltage in the insulation. In addition, it was found that when an oxygen ashing process is carried out after the above described etching, cores made of titanium oxide are generated irrelevant of the existence of the titanium-based reaction product on the surface of the titanium nitride film in the top layer of the lower electrode wiring, and thus, concavity/convexity cores made of titanium oxide are generated. It was also found that a problem arises such that when such concavity/convexity cores are generated, the etchant for the sacrificial pattern permeates through concavity/convexity portions when forming the cavity for the electrostatic variable capacitor, and the lower electrode wiring is corroded. As a result, the reliability of the semiconductor device where the ultrasonic sensor of capacitance detection type and the like are formed is lowered, and the manufacturing yield is also lowered.

An object of the present invention is to provide a technology which can increase the reliability of semiconductor devices.

Another object of the present invention is to provide a technology which can increase the manufacturing yield of semiconductor devices.

The above and other objects and novel characteristics of the present invention will be apparent from the description of this specification and the accompanying drawings.

The typical ones of the inventions disclosed in this application will be briefly described as follows.

The present invention has the steps of: (a) forming a first metal film pattern on a semiconductor substrate; (b) forming a first insulating film on the semiconductor substrate so as to cover the first metal film; (c) removing the first insulating film on an upper surface of the first metal film pattern through etching carried out on the entire surface of the first insulating film to remove the first insulating film on an upper surface of the first metal film pattern and to leave a part of the first insulating film between the neighboring first metal patterns; and (d) removing a metal-containing deposit that has been deposited on the part of the first insulating film which remains between the neighboring first metal film patterns.

The effects obtained by typical aspects of the present invention will be briefly described below.

The reliability of semiconductor devices can be improved.

In addition, the manufacturing yield of semiconductor devices can be increased.

BRIEF DESCRIPTIONS OF THE DRAWINGS

DESCRIPTIONS OF THE PREFERRED EMBODIMENTS

Figure 1:
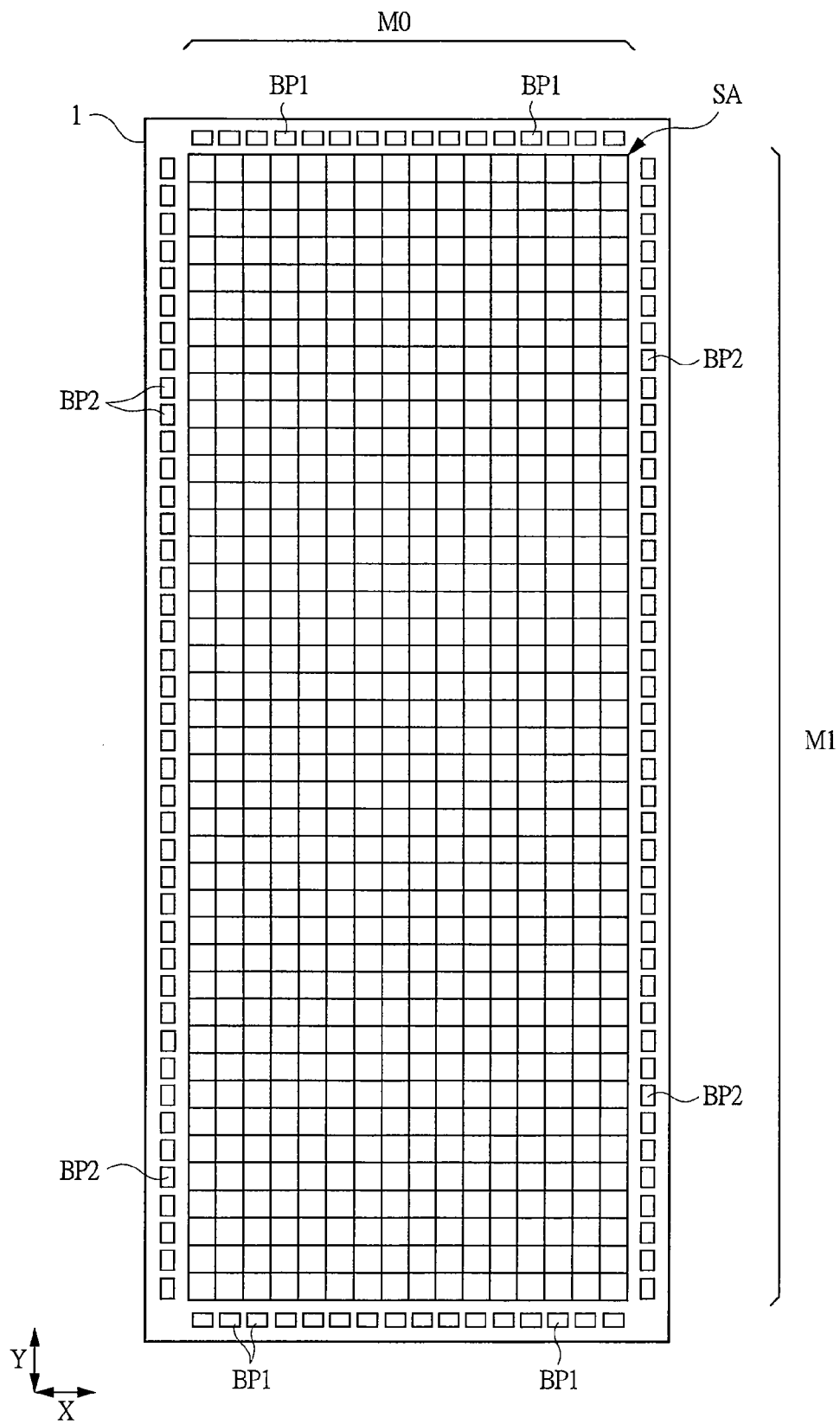
FIG. 1 is a plan view showing the entirety of a semiconductor chip which configures a semiconductor device according to an embodiment of the present invention.

In the following embodiments, explanation will be given separately in a plurality of sections or embodiments when needed for the sake of convenience. However, unless otherwise stated, they are not irrelevant to each other, but are in the relation that one of them is a modification example, detail, supplemental explanation and so on of a part or the entirety of the other part. Moreover, in the following embodiments, when the numbers of elements and the like (including the number of the items, numerical value, amount, range, etc.) are mentioned, they are not limited to the particular numbers unless otherwise stated and it is obviously limited to particular numbers in principle. The number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

In the drawings used for describing embodiments, hatching may be omitted to facilitate visualization in the sectional view. Hatching may be used to facilitate visualization even in the plan view.

First Embodiment

A semiconductor device according to the present embodiment is an ultrasonic transmitting/receiving sensor which is manufactured by using, for example, an MEMS (micro electro mechanical system) technology.

FIG. 1 is a plan view showing the entirety of a semiconductor chip 1 which configures the semiconductor device according to the present embodiment.

The semiconductor chip 1 has a first main surface (upper surface or front surface) and a second main surface (lower surface or rear surface) which are located on the sides opposite to each other in the direction of the thickness, respectively. FIG. 1 is a plan view (top view) showing the semiconductor chip 1 on the first main surface side.

As shown in FIG. 1, the semiconductor chip 1 is formed, for example, in a rectangular form in a plan view. The length of the semiconductor chip 1 in the longitudinal direction (second direction Y) is, for example, about 4 cm and the length of the semiconductor chip 1 in the direction of the short side (first direction X) is, for example, about 1 cm. Here, the dimensions of the semiconductor chip 1 in the plan view are not limited to these, and a variety of modifications are possible. There are sensors in various sizes, for example, one having a length in the longitudinal direction (second direction Y) of about 8 cm and a length in the direction of the short side (first direction X) of about 1.5 cm.

A sensor cell array (oscillator array) SA and a plurality of bonding pads (hereinafter, referred to as pads) BP1 and BP2 are arranged on the first main surface of the semiconductor chip 1.

A plurality of lower electrode wirings M0, a plurality of upper electrode wirings M1 which cross the lower electrode wirings M0 at a right angle, and a plurality of oscillators (sensor cells, corresponding to the oscillators 20 described below) are arranged in the sensor cell array SA.

The plurality of lower electrode wirings M0 are respectively formed so as to extend in the longitudinal direction (second direction Y) of the semiconductor chip 1 and arranged so that 16 channels (hereinafter, also referred to as "ch"), for example, are aligned in the direction of the short side (first direction X) of the semiconductor chip 1.

The respective lower electrode wirings M0 are electrically connected to the pads BP1. The plurality of pads BP1 are arranged in the outer periphery of the sensor cell array SA which is also the vicinity of both ends of the semiconductor chip 1 in the longitudinal direction (second direction Y) so as to be aligned along the short sides of the semiconductor chip 1 and correspond to the lower electrode wirings M0.

The plurality of upper electrode wirings M1 are formed so that each extends in the direction of the short side (first direction X) of the semiconductor chip 1, and arranged for, for example, 192 ch, aligning in the longitudinal direction (second direction Y) of the semiconductor chip 1.

The respective upper electrode wirings M1 are electrically connected to the pads BP2. The plurality of pads BP2 are arranged in the outer periphery of the sensor cell array SA which is also the vicinity of both ends of the semiconductor chip 1 in the direction of the short side (first direction X) so as to be aligned along the long sides of the semiconductor chip 1 and correspond to the upper electrode wirings M1.

The above-said oscillators (corresponding to the oscillators 20 described below) have a configuration of an electrostatic variable capacitance for example, and are arranged at the intersections of the above described lower electrode wirings M0 and the above described upper electrode wirings M1. That is to say, the plurality of oscillators (corresponding to the 20 described below) are arranged within the sensor cell array SA so as to be regularly aligned in a matrix (array) form. Fifty oscillators, for example, are arranged aligning within the sensor cell array SA at the intersections of the lower electrode wirings M0 and the upper electrode wirings M1.

Figure 2:
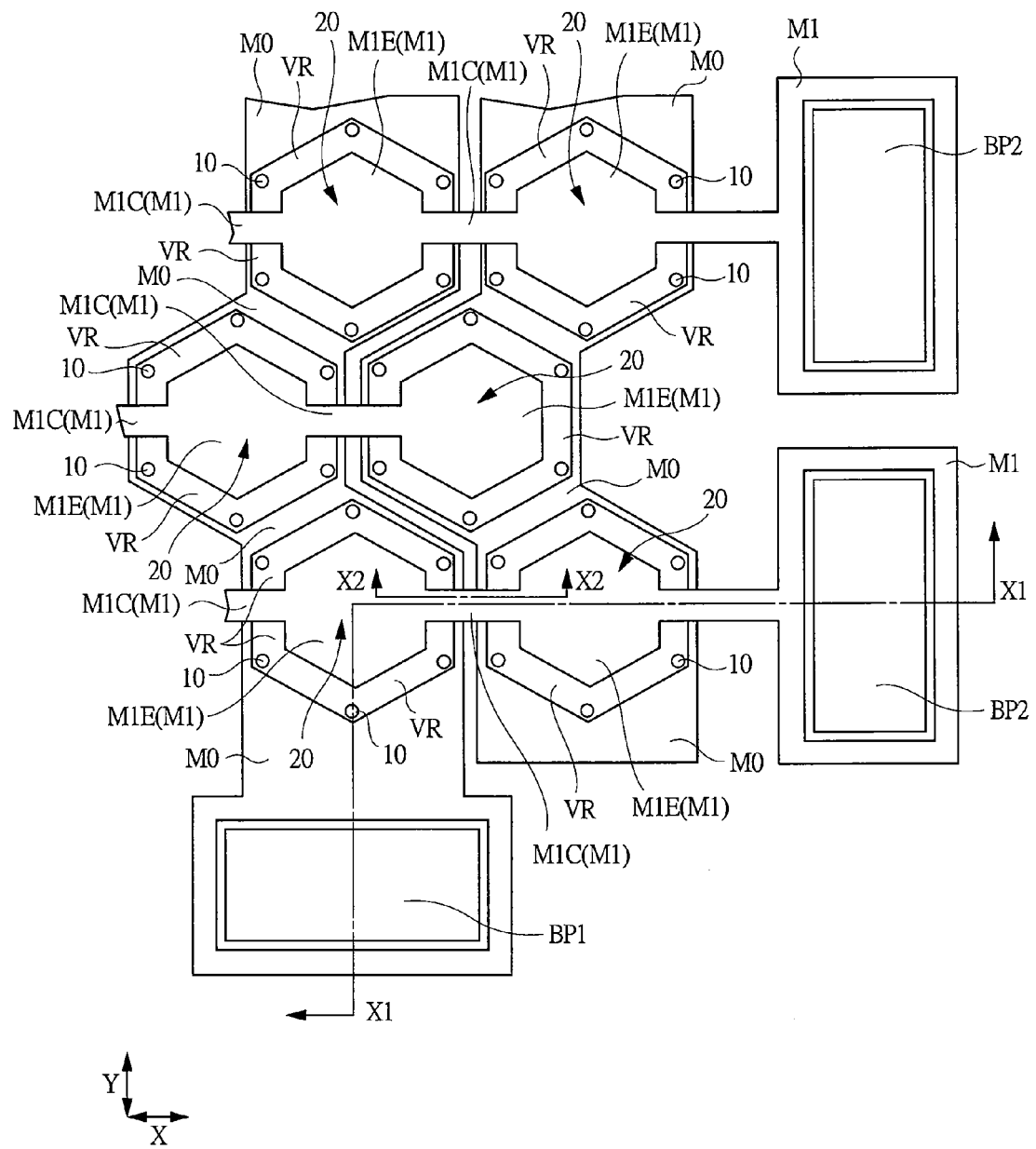
FIG. 2 is a plan view showing an enlarged main part of the semiconductor chip of FIG. 1.
Figure 3:
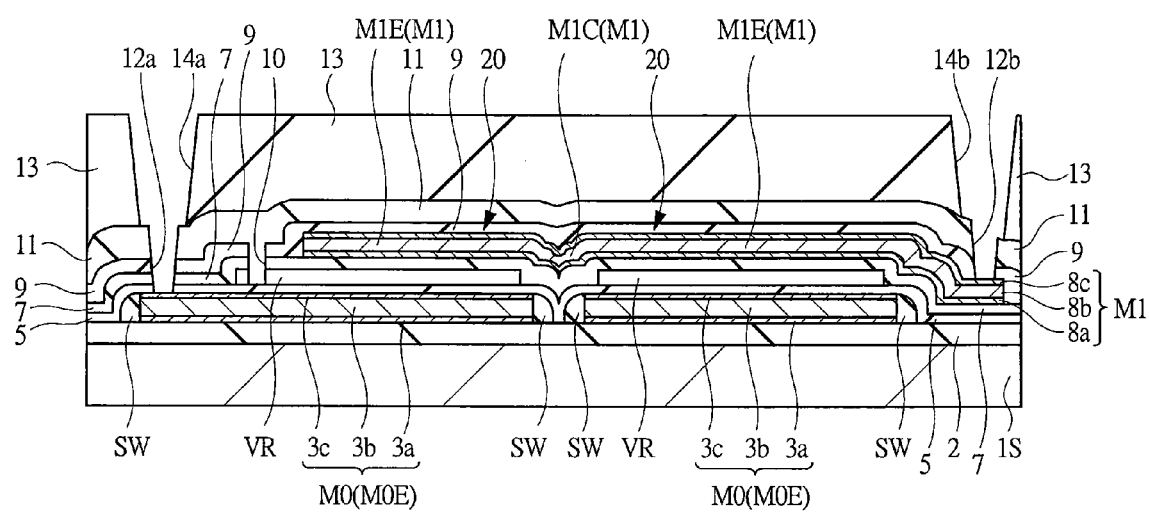
FIG. 3 is a cross sectional view along the line X1-X1 of FIG. 2.

Next, FIG. 2 is a plan view showing an enlarged main part of the above described semiconductor chip 1, and FIG. 3 is a cross sectional view along the line X1-X1 of FIG. 2 showing a main part of the above described semiconductor chip 1. Here, FIG. 2 is a plan view showing a case where one oscillator is arranged at the intersections of the lower electrode wirings M0 and the upper electrode wirings M1.

A semiconductor substrate 1S which forms the semiconductor chip 1 is made of, for example, a single crystal of silicon (Si), and has a first main surface (upper surface or front surface) and a second main surface (lower surface or rear surface) which are located on the sides opposite to each other in the direction of the thickness. The above-said plurality of oscillators 20 are arranged (formed) on the first main surface of the semiconductor substrate is with an insulating film 2 made of, for example, silicon oxide ($SiO_2$) or the like interposed therebetween.

The plurality of oscillators 20, each of which is formed, for example, in hexagon form in the plane are arranged, for example, in a honeycomb form. As a result, the plurality of oscillators 20 can be highly densely arranged, thereby improving the sensor performance.

In addition, each oscillator 20 has a lower electrode M0E, an upper electrode M1E provided so as to face the lower electrode M0E, and a cavity portion VR intervening between these electrodes.

The above-said lower electrode M0E is formed in a part of the lower electrode wiring M0 on which one of the above-said upper electrode wiring M1 is superimposed in the plane. That is to say, the lower electrode M0E of each oscillator 20 is formed by a portion of a lower electrode wiring M0, and the portion of the lower electrode wiring M0 which is superimposed with the upper electrode wiring M1 in the plane (that is to say, a portion located below an upper electrode wiring M1) becomes a lower electrode M0E. The lower electrodes M0E and the lower electrode wirings M0 are formed by, for example, a titanium nitride (TiN) film 3a, an aluminum (Al) film 3b, and a titanium nitride film 3c, which are layered in this order starting from the lower layer. A tungsten (W) film may be used instead of the titanium nitride film 3c.

Sidewalls (sidewall insulating films or sidewall spacers) SW formed by an insulator, for example, silicon oxide, are formed on the sides of the above described lower electrodes M0E and lower electrode wirings M0 in order to reducing the height of the steps due to the thickness of the lower electrodes M0E and lower electrode wirings M0 and some other reasons. The surface of the lower electrodes M0E, the lower electrode wirings M0, the insulating film 2 and the sidewalls SW is coated with an insulating film 5 made of, for example, silicon oxide.

An insulating film 7 made of, for example, a silicon oxide film is deposited on this insulating film 5. The above described upper electrodes M1E are provided on the insulating film 7 so as to face the lower electrodes M0E.

Upper electrodes M1E are formed in portions of the above described upper electrode wirings M1 where the above described lower electrode wirings M0 are superimposed therebelow in the plane. That is so say, the upper electrode M1E of each oscillator 20 is formed by a part of the upper electrode wiring M1 and a part of the upper electrode wiring M1 below which a lower electrode wiring M0 is superimposed in the plane (that is to say, a part located above a lower electrode wiring M0) becomes an upper electrode M1E. An upper electrode M1E is formed in an approximately hexagon form in the plane and wider than a connection portion M1C of an upper electrode wiring M1, which extends in the first direction X and connects between upper electrodes M1E in the pattern. In this manner, an upper electrode wiring M1 has a plurality of upper electrodes M1E and connecting portions M1C for connecting upper electrodes M1E which are neighboring in the first direction X.

The upper electrode wirings M1, which include upper electrodes M1E and connection portions M1C, are formed of, for example, a titanium nitride (TiN) film 8a, an aluminum (Al) film 8b, and a titanium nitride (TiN) film 8c which are layered in this order starting from the lower layer. A tungsten (W) film may be used instead of the titanium nitride film 8c.

The above described cavity portions VR are formed between the above described lower electrodes M0E and upper electrodes M1E (between the insulating film 5 and the insulating film 7). The cavity portions VR are formed, for example, in a hexagon form in the plane. In addition, the cavity portions VR are formed so that the dimensions in the plane are greater than the dimensions of the upper electrodes M1E in the plane. The upper electrodes M1E and the cavity portions VR therebeneath are both in a hexagon form in the pattern in the plane, and the pattern of the upper electrodes M1E in the plane is formed so as to be included in the pattern of the cavity portions VR in the plane.

An insulating film 9 formed by, for example, a silicon nitride ($Si_3N_4$) film is deposited on the above described insulating film 7 so as to cover the upper electrode wirings M1, including the upper electrodes M1E and the connection portions M1C. A hole 10 which reaches the cavity portion VR is formed in the vicinity of the above described cavity portion VR in hexagon form in the insulating films 7 and 9. The hole 10 is a hole for forming the cavity portion VR as described below.

An insulating film 11 formed by, for example, a silicon nitride film is deposited on the above described insulating film 9. A part of this insulating film 11 enters in the above described hole 10, and as a result, the hole 10 is closed.

An opening 12a is formed in the above described insulating films 5, 7, 9, and 11 so as to reach a portion of the lower electrode wiring M0. The portion of the lower electrode wiring M0 which is exposed from the opening 12a becomes the above described pad BP1. In addition, an opening 12b is formed in the above described insulating films 9 and 11 so as to reach a portion of the upper electrode wiring M1. The portion of the above described electrode wiring M1 which is exposed from the opening 12b becomes the above described pad BP2.

An insulating film (protective film) 13 formed by, for example, a negative type photosensitive polyimide film is deposited on the above described insulating film 11.

Openings 14a and 14b are formed in the insulating film 13. Among these, the opening 14a is formed in a location and with dimensions in the plane so as to include the above described opening 12a in the plane, and thus, the portion of the lower electrode wiring M0 which is exposed from the opening 14a becomes the above described pad BP1. In addition, the opening 14b is formed in a location and with dimensions in the planes so as to include the above described opening 12b in the plane, and thus, the portion of the upper electrode wiring M1 which is exposed from the opening 14b becomes the above described pad BP2. Here, the pads BP1 and BP2 are terminals for the input and output of the semiconductor chip 1, and bonding wiring or the like are electrically connected to the pads BP1 and BP2.

The insulating film 13 functions as a protective film for protecting the plurality of oscillators 20 on the first main surface of the semiconductor chip 1 in the dicing step for cutting semiconductor chips 1 out from the semiconductor wafer and the like. In the case where the insulating film 13 is not necessary, the formation of this can be omitted so that the above described insulating film 11 becomes the top layer film (protective film).

In the ultrasonic transmitting/receiving sensor having a configuration as described above, when direct current and alternating current voltages are applied in a superimposed manner to the lower electrode wiring M0 (lower electrode M0E) and the upper electrode wiring M1 (upper electrode M1E), the membrane (film located above the cavity portion VR) oscillates in the direction crossing the first main surface of the semiconductor substrate 1S (upward and downward direction in FIG. 3) in the vicinity of a resonant frequency so as to generate a supersonic pulse of several MHz. In addition, the displacement of the gap between the lower electrode M0E and the upper electrode M1E caused by reflected waves can be detected as a change in the capacitance.

Next, a method for manufacturing the semiconductor device according to the present embodiment is described with reference to FIGS. 4 to 14. Here, FIGS. 4 to 14 are cross sectional views showing a main part of the semiconductor device according to the present embodiment during the manufacturing process, and the cross sectional views show the region corresponding to that of the above described FIG. 3 (the part corresponding to that taken along the line X1-X1 of the above described FIG. 2).

Figure 4:
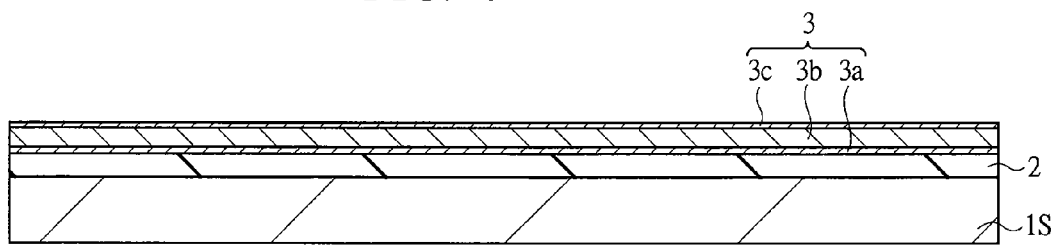
FIG. 4 is a cross sectional view showing a main part of a semiconductor device according to the embodiment of the present invention during a manufacturing process.

First, as shown in FIG. 4, the semiconductor substrate (semiconductor thin plate in approximately disc form in the plane, which is called as a semiconductor wafer at this stage) 1S is prepared. The semiconductor substrate 1S is made of, for example, a single crystal of silicon and has a first main surface (upper surface or front surface) and a second main surface (lower surface or rear surface) which are respectively located on the sides opposite to each other in the direction of the thickness.

Next, the insulating film 2 formed by, for example, a silicon oxide ($SiO_2$) film is formed (deposited) on the entirety of the first main surface of the semiconductor substrate 1S. The film thickness of the insulating film 2 may be, for example, about 400 nm.

Next, the titanium nitride (TiN) film 3a is formed on the insulating film 2. The aluminum (Al) film 3b is formed on the titanium nitride film 3a, and the titanium nitride (TiN) film 3c is formed on the aluminum film 3b. As a result, the multilayer film 3 is formed by the titanium nitride film 3a, the aluminum film 3b, and the titanium nitride film 3c. The aluminum film 3b is formed by a conductor film of which the main component is aluminum, for example, a single aluminum film or an aluminum alloy film. The titanium nitride film 3a, the aluminum film 3b, and the titanium nitride film 3c, which form the multilayer film 3 may be formed through, for example, sputtering. In addition, the aluminum film 3b becomes the main conductive film of the lower electrode wirings M0, and therefore, the film thickness of the aluminum film 3b is greater than that of the titanium nitride films 3a and 3c, and for example, the film thickness of the titanium nitride film 3a may be about 50 nm, that of the aluminum film 3b may be about 500 nm, and that of the titanium nitride film 3c may be about 50 nm.

Note that, the titanium nitride film 3c may be formed slightly thicker in advance, taking the amount of the titanium nitride film 3c to be etched in the etching process 22 described below into consideration. For example, in the case where it is desired to have the titanium nitride film 3c to be etched and reduced by a thickness of about 20 nm in the etching process 22 described below and the final thickness of the titanium nitride film 3c to be about 50 nm, the initial thickness (deposition thickness of the film) of the titanium nitride film 3c may be about 70 nm.

In addition, a titanium (Ti) film may be formed on the insulating film 2, and then, the titanium nitride film 3a may be formed on this titanium film. Moreover, a titanium (Ti) film may be formed on the aluminum film 3b, and then, the titanium nitride film 3c may be formed on this titanium film.

Figure 5:
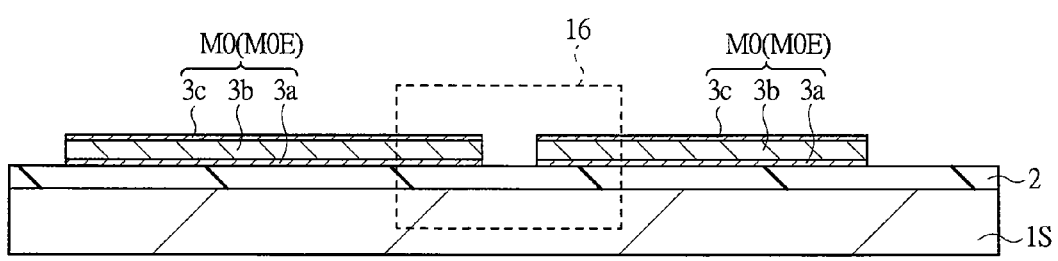
FIG. 5 is a cross sectional view showing the main part of the semiconductor device during the manufacturing process continued from FIG. 4.

Next, as shown in FIG. 5, the multilayer film 3 is patterned (processed and selectively removed) through lithography, a dry etching method and the like. The patterned multilayer film 3 forms the lower electrode wirings M0 (lower electrodes M0E). Accordingly, the lower electrode wirings M0 are formed by a multilayer film (multilayer film 3) having a first conductor film (aluminum film 3b) of which the main component is aluminum and a second conductor film (titanium nitride film 3c) made of titanium nitride which is the top layer thereof.

In this manner, the lower electrode wirings M0 (first metal film pattern) are formed on the semiconductor substrate 1S (on the insulating film 2 on the semiconductor substrate 1S). The lower electrode wirings M0 are formed by, as described above, the multilayer film having the patterned metal film (aluminum film 3b) and metal nitride films (titanium nitride films 3a and 3c), and therefore, can be regarded as a metal film pattern (first metal film pattern).

Here, the lithography (photolithography) is a method for patterning a resist film into a desired pattern (resist pattern) through the sequential steps of: application of a resist film (photoresist film); exposure to light; and development.

In addition, the titanium nitride film 3a of the bottom layer of the multilayer film 3 (lower electrode wirings M0) may function to increase the adhesiveness between the insulating film 2 and the lower electrode wirings M0 (multilayer film 3). The aluminum film 3b of the multilayer film 3 (lower electrode wirings M0) is the main conductor film of the lower electrode wirings M0, and the aluminum film 3b may be formed by a conductor film of which the main component is aluminum, for example, aluminum or an aluminum alloy, so that a reduction in the resistance of the lower electrode wirings M0 can be achieved. The titanium nitride film 3c of the top layer of the multilayer film 3 (lower electrode wirings M0) may function as a reflection preventing film in the step of exposure to light during the lithography (photolithography) process where the multilayer film 3 is patterned. In addition, the titanium nitride film 3c of the top layer of the multilayer film 3 (lower electrode wirings M0) may function to reduce the unevenness on the upper surface of the aluminum film 3b so as to increase the flatness on the upper surface of the lower electrode wirings M0.

Figure 6:
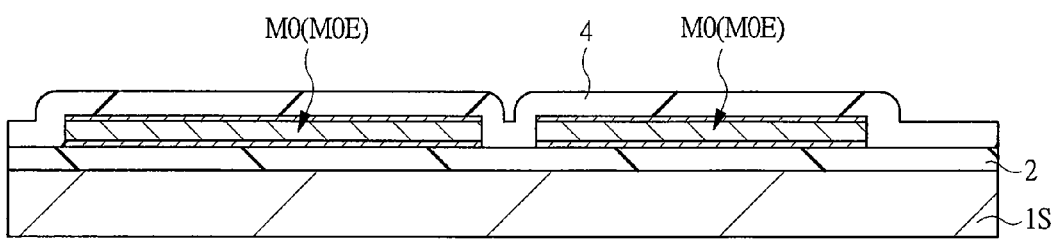
FIG. 6 is a cross sectional view showing the main part of the semiconductor device during the manufacturing process continued from FIG. 5.
Figure 7:
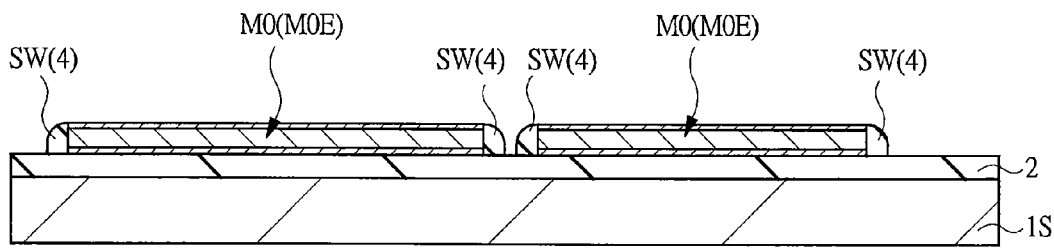
FIG. 7 is a cross sectional view showing the main part of the semiconductor device during the manufacturing process continued from FIG. 6.

Next, as shown in FIG. 6, the insulating film 4 (first insulating film), such as a silicon oxide film, is deposited (formed) on the entirety of the first main surface of the semiconductor substrate 1S (semiconductor wafer) (i.e., on the insulating film 2) so as to cover the surface of the lower electrode wirings M0. Then, etch-back (etching on the entire surface) is carried out on this insulating film 4 through anisotropic dry etching, and thus, as shown in FIG. 7, the insulating film 4 is left on the sides (sidewalls) of the lower electrode wirings M0 (lower electrodes M0E) so that sidewalls (sidewall insulating films) SW are formed, and at the same time, the insulating film 4 on the upper surface of the lower electrode wirings M0 is removed so that the upper surfaces of the lower electrode wiring M0 (upper surface of the titanium nitride film 3c of the top layer) is exposed.

Next, the step of removing the deposit (corresponding to a deposit 21 described below) that has been deposited on the surface of the semiconductor substrate 1S during the etch-back process of the insulating film 4 and the like (Steps S4 to S7 described below) are carried out, and these steps are described in further detail in the following.

Figure 8:
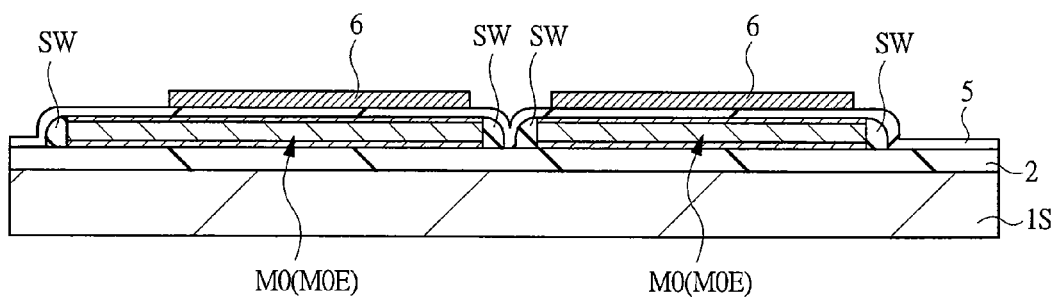
FIG. 8 is a cross sectional view showing the main part of the semiconductor device during the manufacturing process continued from FIG. 7.

Next, as shown in FIG. 8, the insulating film 5 (third insulating film) is formed (deposited) on the entirety of the first main surface of the semiconductor substrate 1S (i.e., on the insulating film 2) so as to cover the surface of the lower electrode wirings M0 (lower electrodes M0E) and the surface of the sidewalls SW. The insulating film 5 is formed by, for example, a silicon oxide film and may be formed through CVD. The thickness of the insulating film 5 is, for example, about 200 nm.

Next, a sacrificial film formed by, for example, a polycrystalline silicon film is deposited on the entire surface of the insulating film 5 on the first main surface of the semiconductor substrate 1S through CVD so as to have a thickness of about 100 nm, and after that, this sacrificial film is patterned through lithography and dry etching, and thus, the sacrificial pattern (sacrificial pattern for creating cavity portions) 6 is formed. This sacrificial pattern 6 is a pattern for creating the above described cavity portions VR, and the form of the sacrificial pattern 6 in the plane is the same as the pattern for the cavity portions VR in the plane. Accordingly, the sacrificial pattern 6 is formed in the regions where cavity portions VR are formed.

Figure 9:
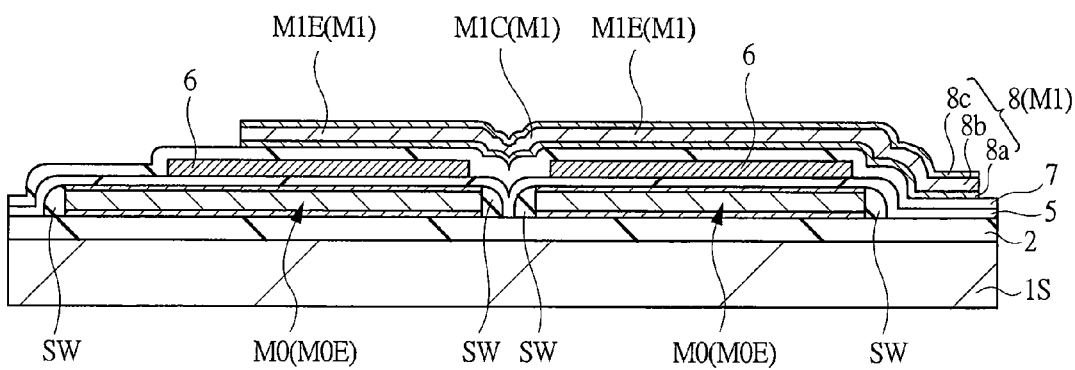
FIG. 9 is a cross sectional view showing the main part of the semiconductor device during the manufacturing process continued from FIG. 8.

Next, as shown in FIG. 9, the insulating film 7 (fourth insulating film) is formed (deposited) on the entirety of the first main surface of the semiconductor substrate 1S (i.e., on the insulating film 5) so as to cover the surface of the sacrificial pattern 6. The insulating film 7 is formed by, for example, a silicon oxide film and may be formed through CVD or the like. The thickness of the insulating film 7 may be, for example, about 200 nm.

Next, the titanium nitride (TiN) film 8a is formed on the insulating film 7, the aluminum (Al) film 8b is formed on the titanium nitride film 8a and the titanium nitride (TiN) film 8c is formed on the aluminum film 8b. As a result, the multilayer film 8 formed by the titanium nitride film 8a, the aluminum film 8b, and the titanium nitride film 8c is formed on the insulating film 7. The aluminum film 8b is formed by a conductor film of which the main component is aluminum, for example, a single aluminum film or an aluminum alloy film. The titanium nitride film 8a, the aluminum film 8b, and the titanium nitride film 8c which form the multilayer film 8 may be formed through, for example, sputtering. In addition, the aluminum film 8b is the main conductor film of the above described electrode wirings M1, and therefore, the film thickness of the aluminum film 8b is greater than the film thickness of the titanium nitride films 8a and 8c. In addition, the total thickness of the multilayer film 8 for to form the upper electrode wirings is smaller than the total thickness of the multilayer film 3 to form the above described lower electrode wirings and may be, for example, about 400 nm. In this case, the film thickness of the titanium nitride film 8a, the aluminum film 8b, and the titanium nitride film 8c may be, for example, about 50 nm, 300 nm, and 50 nm, respectively.

Further, a titanium (Ti) film may be formed on the insulating film 7, and then, the titanium nitride film 8a may be formed on this titanium film. Furthermore, a titanium (Ti) film may be formed on the aluminum film 8b, and then, the titanium nitride film 8c may be formed on this titanium film.

Next, the multilayer film 8 is patterned through lithography, dry etching and the like. The patterned multilayer film 8 forms upper electrode wirings M1 (upper electrodes M1E and connection portions M1C). As a result, the upper electrode wirings M1 (second metal film pattern) are formed on the insulating film 7. The upper electrode wirings M1 are formed by the multilayer film of the patterned metal film (aluminum film 8b) and the metal nitride films (titanium nitride films 8a and 8c) as described above, and therefore, may be regarded as a metal film pattern (second metal film pattern).

Here, the multilayer film formed by the insulating film 5, the sacrificial pattern 6 and the insulating film 7 may be regarded as a type of insulating film (second insulating film), and it can be regarded that this insulating film (second insulating film) is formed on the semiconductor substrate 1S (on the insulating film 2 on the semiconductor substrate 1S) so as to cover the upper electrode wirings M1 (first metal film pattern), and the above described electrode wirings M1 (second metal film pattern) are formed on the insulating film (second insulating film) formed by the insulating film 5, the sacrificial pattern 6, and the insulating film 7.

The titanium nitride film 8a, the aluminum film 8b, and the titanium nitride film 8c of the upper electrode wirings M1 function in similar manner as the above described titanium nitride film 3a, aluminum film 3b, and titanium nitride film 3c of the lower electrode wirings M0, respectively. Therefore, the description thereof is omitted here.

Figure 10:
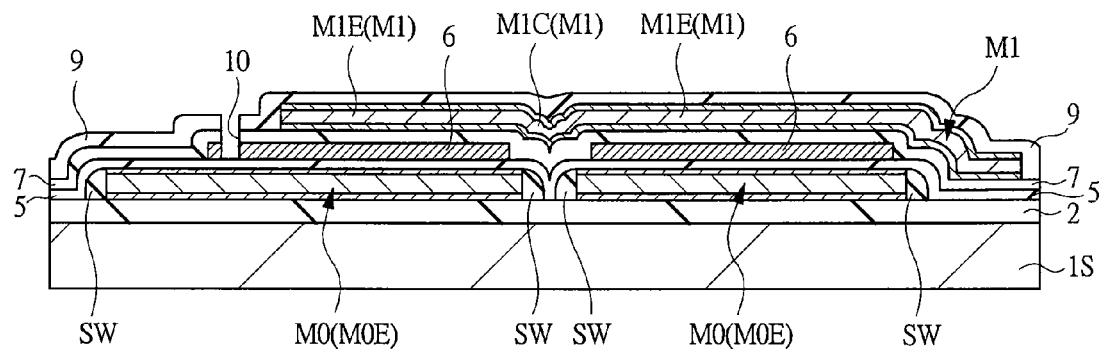
FIG. 10 is a cross sectional view showing the main part of the semiconductor device during the manufacturing process continued from FIG. 9.

Next, as shown in FIG. 10, the insulating film 9 is formed (deposited) on the entirety of the first main surface of the semiconductor substrate 1S (i.e., on the insulating film 7) so as to cover the upper electrode wirings M1 (upper electrodes M1E). The insulating film 9 is formed by, for example, a silicon nitride ($Si_3N_4$) film or the like and may be formed through CVD. In addition, the thickness of the insulating film 9 may be, for example, about 500 nm.

Next, the hole (opening) 10 is formed in the insulating films 9 and 7 through lithography and dry etching so as to reach the above described sacrificial pattern 6. A portion of the sacrificial pattern 6 is exposed from the bottom of the hole 10.

Figure 11:
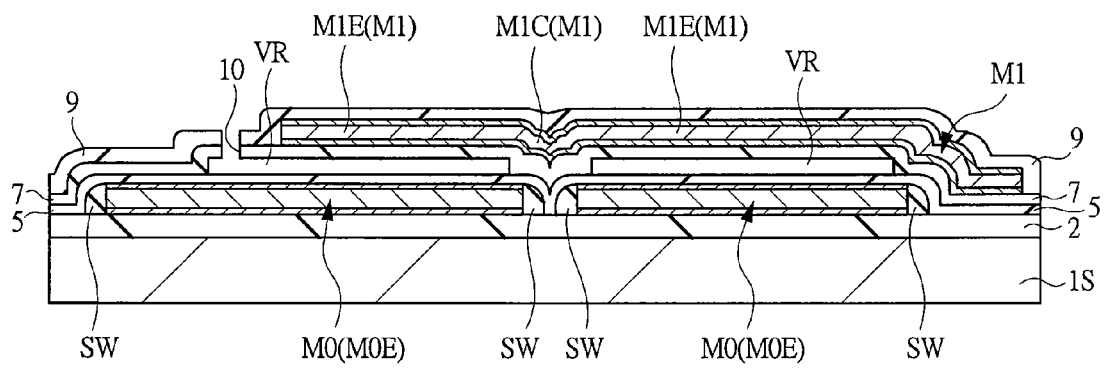
FIG. 11 is a cross sectional view showing the main part of the semiconductor device during the manufacturing process continued from FIG. 10.

Next, the sacrificial pattern 6 is selectively wet-etched with, for example, a potassium hydroxide solution through the hole 10. As a result, as shown in FIG. 11, the sacrificial pattern 6 is removed so that the region where the sacrificial pattern 6 existed become the cavity portion VR, and thus, the cavity portion VR is formed in the gap where the lower electrode wiring M0 (lower electrode M0E) and the upper electrode wiring M1 (upper electrode M1E) facing each other (in the region where the sacrificial pattern 6 is removed). In this manner, the sacrificial pattern 6 is selectively etched through the holes 10, and thus, cavity portions VR can be formed between the lower electrode wirings M0 (first metal film pattern) and the upper electrode wirings M1 (second metal film pattern).

Note that, the portion of the lower electrode wiring M0 facing the upper electrode wiring M1 via the cavity portion VR is the lower electrode M0E, and the portion of the upper electrode wiring M1 facing the lower electrode wiring M0 via the cavity portion VR is the upper electrodes M1E.

Figure 12:
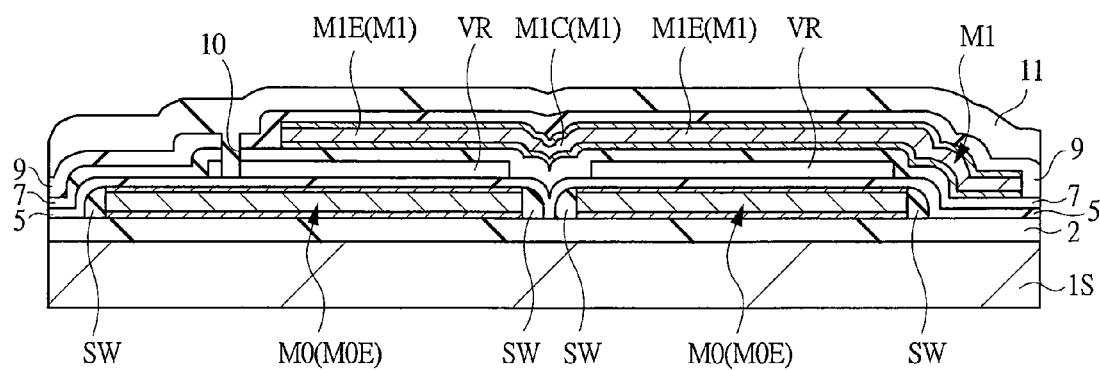
FIG. 12 is a cross sectional view showing the main part of the semiconductor device during the manufacturing process continued from FIG. 11.

Next, as shown in FIG. 12, the insulating film 11 is formed (deposited) on the entirety of the first main surface of the semiconductor substrate 1S (i.e., on the insulating film 9). As a result, the hole 10 is filled with a part of the insulating film 11 so that the hole 10 can be closed. The insulating film 11 is formed by, for example, a silicon nitride film and may be formed through plasma CVD. In addition, the thickness of the insulating film 11 may be, for example, about 800 nm.

Figure 13:
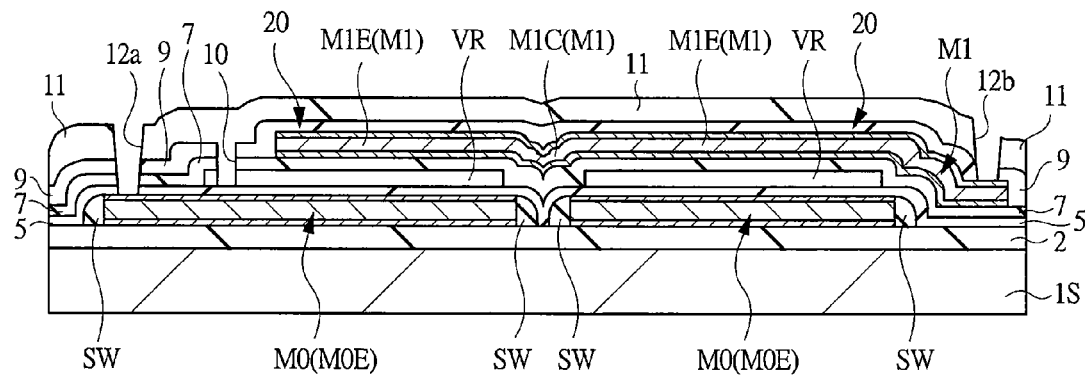
FIG. 13 is a cross sectional view showing the main part of the semiconductor device during the manufacturing process continued from FIG. 12.

Next, as shown in FIG. 13, the opening 12a is formed in the insulating films 11, 9, 7, and 5 so as to expose a portion of the lower electrode wiring M0, and the opening 12b is formed in the insulating films 11 and 9 so as to expose a portion of the upper electrode wiring M1 through lithography and dry etching. In this manner, the oscillators 20 having a configuration of the electrostatic variable capacitor are formed.

Figure 14:
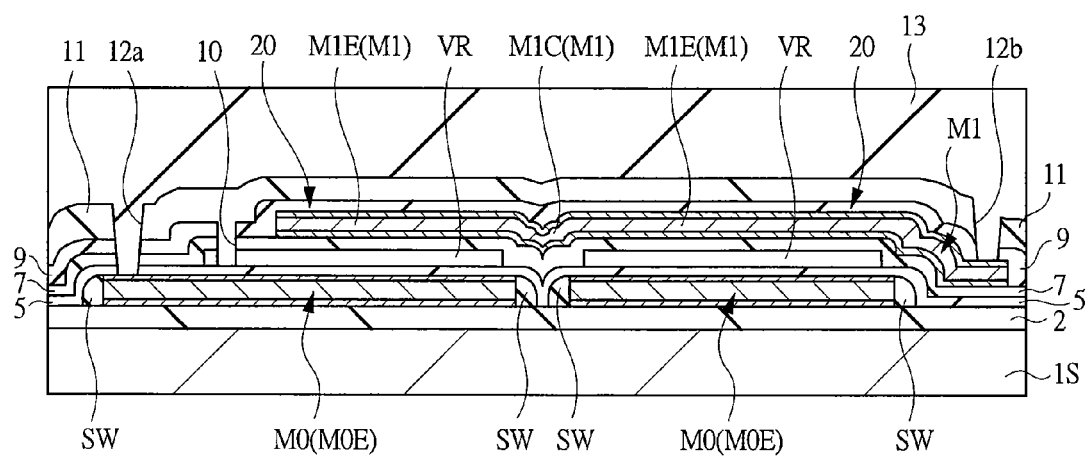
FIG. 14 is a cross sectional view showing the main part of the semiconductor device during the manufacturing process continued from FIG. 13.

Next, as shown in FIG. 14, the insulating film 13 formed by, for example, a negative type photosensitive polyimide film is formed on the entirety of the first main surface of the semiconductor substrate 1S (i.e., on the insulating film 11). Then, as shown in the above described FIG. 3, openings 14a and 14b are formed in the insulating film 13 so as to expose a portion of the lower electrode wiring M0 and the upper electrode wiring M1 through exposure to the light, development process, and the like. Portions of the lower electrode wiring M0 and the upper electrode wiring M1 which are exposed from the openings 14a and 14b become the above described pads BP1 and BP2.

After that, individual chip regions are cut out from the semiconductor substrate 1S (semiconductor wafer) in a dicing process, and thus, the above described semiconductor chip 1 can be manufactured.

Next, from the step of forming lower electrode wirings M0 (lower electrodes M0E) (step of patterning multilayer film 3) to the step of forming an insulating film 5 among the above described manufacturing processes are described in further details.

Figure 15:
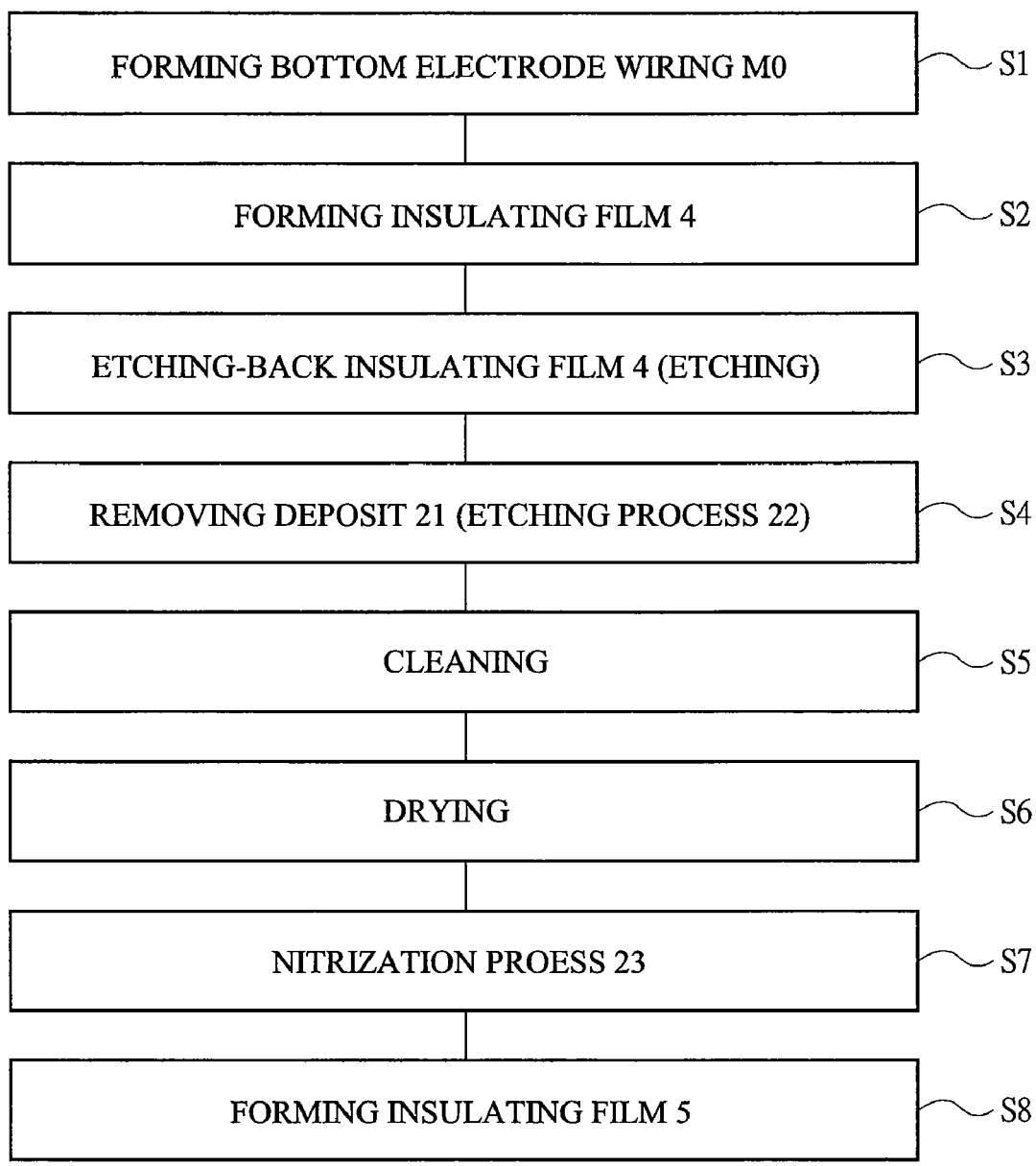
FIG. 15 is a flow chart of the manufacturing process which partially shows the manufacturing steps of the semiconductor device according to the embodiment of the present invention.

FIG. 15 is a flow chart of the manufacturing process which partially shows the manufacturing steps of the semiconductor device according to the present embodiment. FIGS. 16 to 21 are cross sectional views showing a main part of the semiconductor device according to the present embodiment during the manufacturing processes. FIGS. 16 to 21 show the region corresponding to the region 16 surrounded by the dotted line in the above described FIG. 5. That is to say, FIGS. 16 to 21 are cross sectional views showing a part corresponding to the part along the line X2-X2 in the above described FIG. 2.

Figure 16:
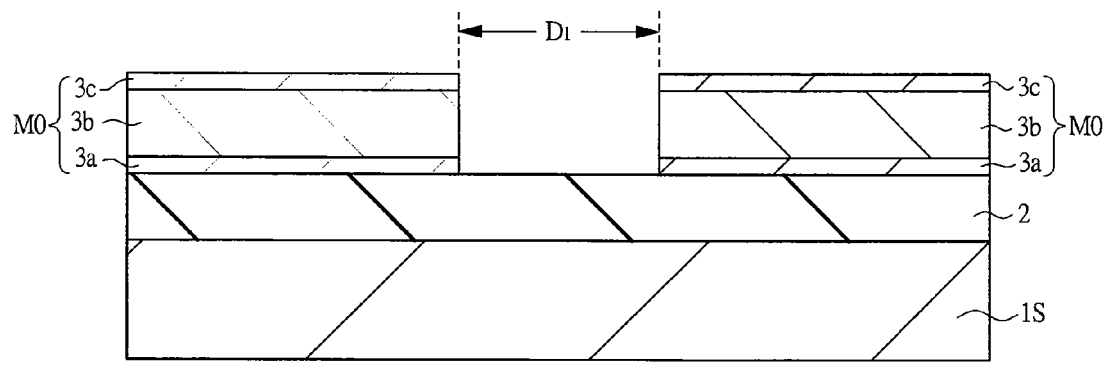
FIG. 16 is a cross sectional view showing a main part of a semiconductor device according to the embodiment of the present invention during the manufacturing process.

FIG. 16 is a cross sectional view showing the main part at the same process stage as in the above described FIG. 5. As described above, the multilayer film 3 (i.e., the multilayer film of the titanium nitride film 3a, the aluminum film 3b, and the titanium nitride film 3c) formed on the semiconductor substrate 1S (on the insulating film 2 on the semiconductor substrate 1S) is patterned, and thus, the lower electrode wirings M0 (first metal film pattern) are formed on the semiconductor substrate 1S (on the insulating film 2 on the semiconductor substrate 1S) (Step S1), so that the structure of FIG. 16 corresponding to that in the above described FIG. 5 is obtained. The distance between neighboring lower electrode wirings M0 (gap between neighboring lower electrode wirings M0) $D_1$ is, for example, about 2 μm.

Figure 17:
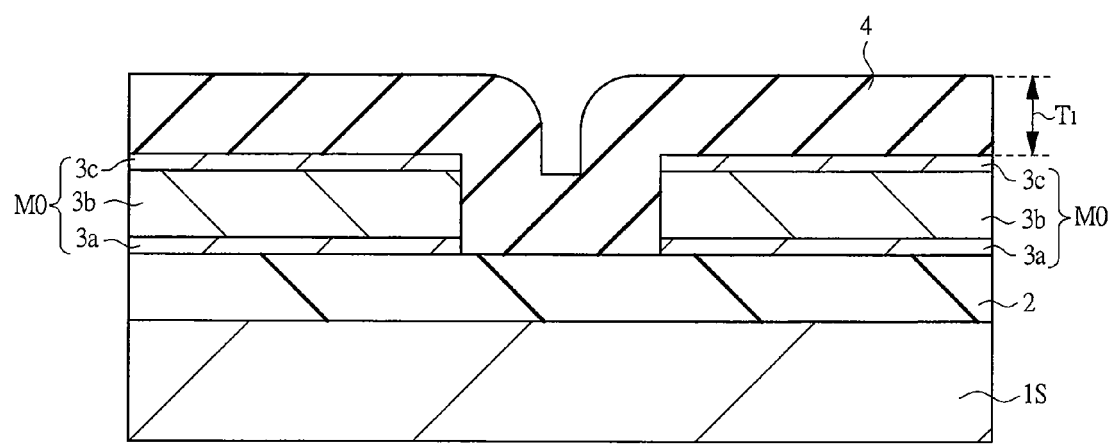
FIG. 17 is a cross sectional view showing the main part of the semiconductor device during the manufacturing process continued from FIG. 16.

After the structure of FIG. 16 is obtained, as shown in FIG. 17 (FIG. 17 shows a portion at the same process stage as in the above described FIG. 6), the insulating film 4 (first insulating film) is formed (deposited) on the semiconductor substrate 1S (on the insulating film 2 on the semiconductor substrate 1S) so as to cover the lower electrode wirings M0 (first metal film pattern) (Step S2). The insulating film 4 is formed by, for example, a silicon oxide film, and can be formed through plasma CVD (chemical vapor deposition) or the like. The thickness (deposition thickness) $T_1$ of the insulating film 4 is equal to or greater than half of the distance $D_1$ between neighboring lower electrode wirings M0 (i.e., $T_1 \geq D_1/2$), for example, about 600 nm.

Figure 18:
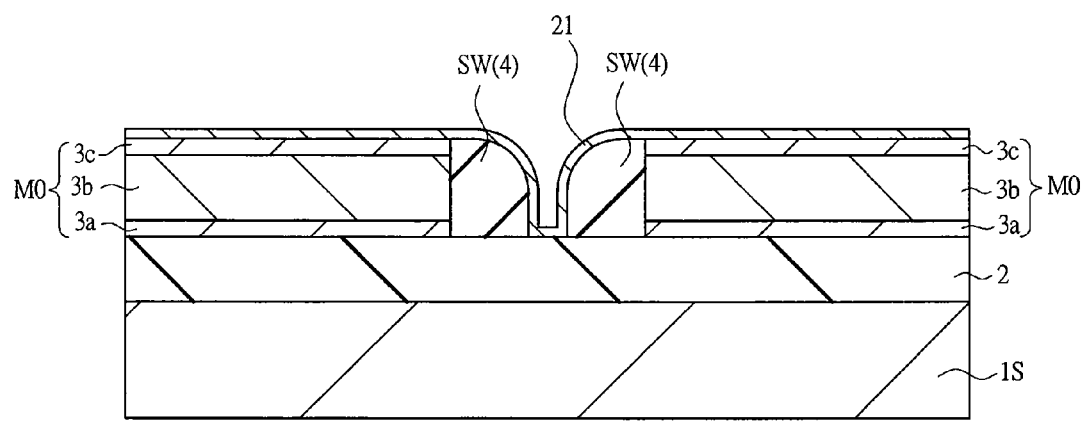
FIG. 18 is a cross sectional view showing the main part of the semiconductor device during the manufacturing process continued from FIG. 17.

Next, as shown in FIG. 18, etch-back (etching on the entire surface) is carried out on the insulating film 4 through anisotropic dry etching, until the upper surface of the lower electrode wirings M0 (upper surface of the titanium nitride film 3c of the top layer) is exposed, and thus, the sidewalls (sidewall insulating films) SW are formed on the sides (sidewalls) of the lower electrode wirings M0 (lower electrodes M0E) (Step S3). That is to say, in Step S3, etching is carried out on the entire surface (entirety of the upper surface, or entirety of the main surface) of the insulating film 4, and thus, the insulating film 4 (first insulating film) is removed from the upper surface of the lower electrode wirings M0 (first metal film pattern), and portions of the insulating film 4 (first insulating film) (here, sidewalls SW) are left between neighboring lower electrode wirings M0 (in the first metal film pattern). As a result, the etch-back process on the insulating film 4 in the Step S3 allows portions of the insulating film 4 to remain on the sidewalls (sides) of the lower electrode wirings M0 (the first metal film pattern) as sidewall insulating films (sidewalls SW).

Further, in the etch-back process on the insulating film 4 in the Step S3, no etching mask such as a photoresist film is used, and the etching is carried out on the entire surface of the insulating film 4 (i.e., the entire surface of the insulating film 4 is etched). And thus, portions of the insulating film 4 are left as sidewalls SW between neighboring lower electrode wirings M0, and other portions of the insulating film 4 (portions other than the sidewalls SW) are removed, so that the insulating film 4 is completely removed from the entirety of the upper surface of the lower electrode wirings M0.

In the case where the deposition thickness (the above described thickness $T_1$) of the insulating film 4 becomes too great in the Step S2, there is a possibility that sidewalls SW may not be well formed even if the anisotropic etching is carried out on the insulating film 4, and appropriate sidewalls SW can be formed through anisotropic etching of the insulating film 4 by adjusting the thickness to half or less of the distance $D_1$ between neighboring lower electrode wirings M0.

In the etch-back process on the insulating film 4 in the Step S3, sidewalls SW are formed. Therefore, it is necessary to carry out anisotropic dry etching, so that the insulating film 4 can be selectively etched. Therefore, it is preferable in the etch-back process on the insulating film 4 in the Step S3 to carry out ion assisted dry etching (ion etching, ion assisted etching, or reactive ion etching), such as reactive ion etching (RIE).

The ion assisted dry etching carried out in Step S3 is performed in such a manner so that etching of the object (here, the insulating film 4) is accelerated (made to progress), by using ion bombardment (attack using ions, physical effects, or ion assisted effects) together with reaction by radicals (chemical effects). That is to say, the ion assisted dry etching is a dry etching having ion assisted effects of accelerating (making progress in) etching by ion bombardment together with reaction using radicals. Therefore, the gas (etching gas) used for the etch-back of the insulating film 4 in the Step S3 contains argon (Ar) or a rare gas of which the atomic number is greater than that of argon (Ar), and the etch-back is carried out on the insulating film 4 in the Step S3 by converting this gas to plasma (ions). It is preferable to use argon (Ar) gas, which is least expensive among argon (Ar) and rare gases of which the atomic number is greater than that of argon (Ar) (i.e., argon (Ar), krypton (Kr), xenon (Xe) and radon (Rn)), because reduction of costs becomes possible. In addition, it is preferable for etch-back on the insulating film 4 in the Step S3 to be carried out while applying a bias voltage to the semiconductor substrate 1S, in order to accelerate the movement of ions.

Further, it is preferable that the gas (etching gas) used for the etch-back on the insulating film 4 in the Step S3 contains a fluorine-based gas (fluorine containing gas or fluoride gas) such as $CF_4$ and $CHF_3$ in addition to containing argon (Ar) or a rare gas of which the atomic number is greater than that of argon (Ar) as described above. That is to say, a gas containing a rare gas (argon (Ar) or a rare gas of which the atomic number is greater than that of argon (Ar)) and fluorine-based gas is converted to plasma, and the etch-back (ion assisted dry etching) is carried out on the insulating film 4. Accordingly, etching (physical and chemical etching) can be made to progress (accelerated) in the etch-back of the insulating film 4 in the Step S3 through the physical effects (ion bombardment) of argon (Ar) ions (or ions of a rare gas of which the atomic number is greater than that of argon), and chemical reaction using fluorine (F) radicals or fluoride radicals. As a result, both anisotropy and selectivity can be obtained in etching. The etch-back process on the insulating film 4 in the Step S3 can be carried out through, for example, anisotropic RIE (reactive ion etching) of a parallel plate type using a mixed gas of $CF_4$ gas, $CHF_3$ gas, and Ar gas as the etching gas.

In the etch-back process on the insulating film 4 in the Step S3, sidewalls (sidewall insulating films) SW are formed by the insulating film 4 which remains on the sides (sidewalls) of the lower electrode wirings M0 (lower electrodes M0E), and at the same time, the insulating film 4 is completely removed from the upper surface of the lower electrode wiring M0, so that the upper surface of the lower electrode wiring M0 (upper surface of the titanium nitride film 3c of the top layer) is exposed. As described above, etching is carried out in the etch-back process in the Step S3 by ion bombardment through etching (ion assisted dry etching), and therefore, the upper surface of the lower electrode wiring M0 (upper surface of the titanium nitride film 3c of the top layer) is shaved by ion bombardment (etched or sputtered) at the stage where the upper surface of the lower electrode wiring M0 (upper surface of the titanium nitride film 3c of the top layer) is exposed. It is necessary to make it over-etched to a certain extent, in order to prevent the insulating film 4 from remaining on the top surface of the lower electrode wiring M0 after etching in the etch-back process on the insulating film 4 in the Step S3, and during this process, ion bombardment on the upper surface of the lower electrode wiring M0 (upper surface of the titanium nitride film 3c of the top layer) is continued.

Therefore, when the upper surface of the lower electrode wiring M0 (upper surface of the titanium nitride film 3c of the top layer) is exposed in the etch-back process on the insulating film 4 in the Step S3, the upper surface of the lower electrode wiring M0 (upper surface of the titanium nitride film 3c of the top layer) is sputtered, so that, as schematically shown in FIG. 18, deposit containing a metal element (metal-containing deposit, reaction product, or titanium-based reaction product) 21 is deposited on the entire surface (i.e., on the surface of the insulating film 2, the lower electrode wiring M0, and the sidewalls SW) of the semiconductor substrate 1S (semiconductor wafer). Here, though FIG. 18 shows a state where the deposit 21 is deposited in film form (layer form), the state in which the deposit 21 is deposited is not limited to this, and for example, cases where some portions in which the deposit 21 is deposited and other portions in which the deposit 21 is not deposited are mixed, as well as cases where some portions in which the deposit 21 is thickly deposited and other portions in which the deposit 21 is thinly deposited are mixed are included.

The deposit 21 is a reaction product of a reaction between the upper surface of the lower electrode wiring M0 (upper surface of the titanium nitride film 3c of the top layer) which has been shaved (sputtered) through ion bombardment or the like and a component of the gas (etching gas) used for the etch-back containing a metal element (here, titanium (Ti) which forms the titanium nitride film 3c) which forms the upper surface of the lower electrode wiring M0 (upper surface of the titanium nitride film 3c of the top layer). That is to say, the deposit 21 is deposited during the etch-back (etching) of the insulating film 4 in the Step S3 containing a metal element (here, Ti) which forms the upper surface of the lower electrode wiring M0 (i.e., the upper surface of the titanium nitride film 3c of the top layer), and can be regarded as a metal-containing deposit. The deposit 21 is deposited (adheres) also on the surface of the insulating film 2 and the sidewalls SW.

Figure 19:
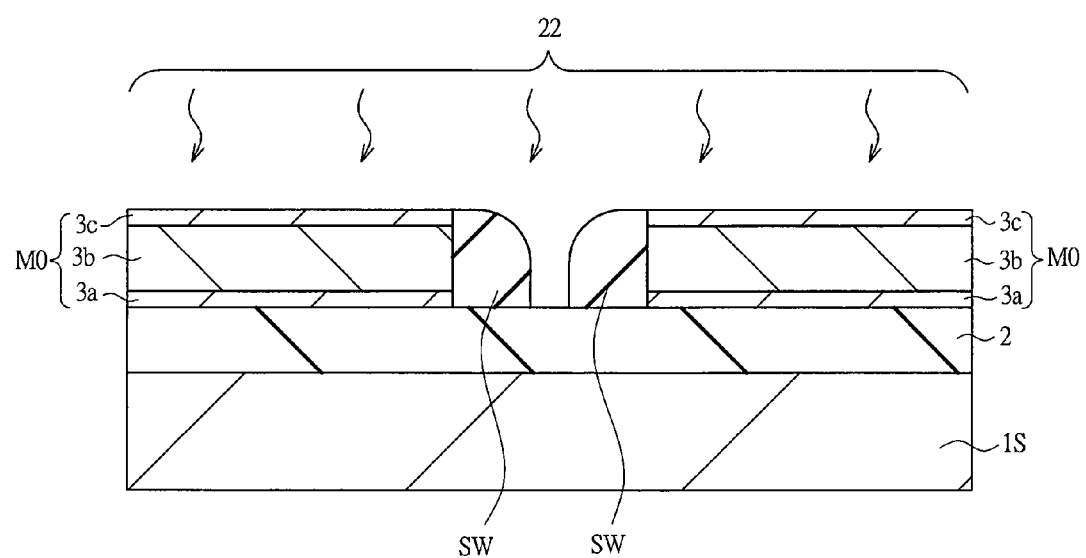
FIG. 19 is a cross sectional view showing the main part of the semiconductor device during the manufacturing process continued from FIG. 18.

Next, the above described deposit 21 that has deposited on the surface of the semiconductor substrate 1S during the etch-back process of the insulating film 4 in the Step S3 is removed (Step S4). In the Step S4, the deposit 21 is removed through the etching process 22, as shown in FIG. 19. Here, FIG. 19 schematically shows the etching process 22 for removing the deposit 21.

As described above, the deposit 21 that has deposited during the etching in the Step S3 is also deposited on the insulating film 4 (here, sidewalls SW) which remains between neighboring lower electrode wirings M0, and therefore, in the Step S4, the deposit 21 (metal-containing deposit) that has deposited on the insulating film 4 (here, sidewalls SW) which remains between neighboring lower electrode wirings M0 (first metal film pattern) is also removed through the etching process 22.

It is necessary to use an etching method according to which the deposit 21 can be removed (etched) and at the same time the insulating film 4 (sidewalls SW) is difficult to be removed (etched) in the process for removing the deposit 21 (i.e., the etching process 22) in the Step S4. In addition, it is preferable for the etching process 22 to be an isotropic etching process, so that the deposit 21 can also be removed from the sidewalls SW. Therefore, unlike the etch-back process on the insulating film 4 in the Step S3, it is preferable for the process for removing the deposit 21 i.e., the etching process 22) in the Step S4 to be carried out through radical etching without using ion bombardment.

Unlike in the present embodiment, in the case where the process for removing the deposit 21 in the Step S4 is carried out through etching (ion etching) using ion bombardment, the sidewalls SW (insulating film 4) made of silicon oxide or the like are also etched together with the removal of the deposit 21, and accordingly, the sidewalls SW, which were formed in necessity get to be receded.

In contrast, according to the present embodiment, radical etching (chemical dry etching) not using ion bombardment is carried out in the process for removing the deposit 21 (etching process 22) in the Step S4, and thus, the deposit 21 can be etched and removed while suppressing or preventing the sidewalls SW (insulating film 4) and the lower electrode wiring M0 from being etched.

Radical etching (here, the etching process 22 in Step S4) is carried out in such a manner that the object (here, the deposit 21) is etched through a chemical reaction (chemical effects) using fluorine (F) radicals or fluoride radicals, while etching by ion bombardment (attack using ions or physical effects) is prevented. Therefore, it is preferable in the process for removing the deposit 21 (etching process 22) in the Step S4 to carry out dry etching (plasma etching) without applying a bias voltage to the semiconductor substrate 1S. In addition, the gas (etching gas) used in the process for removing the deposit 21 (etching process 22) in the Step S4 contains, for example, a fluorine-based gas (a fluoride gas or a fluorine-containing gas), such as $CF_4$, and does not contain argon (Ar) or a rare gas of which the atomic number is greater than that of argon (Ar) (i.e., argon (Ar), krypton (Kr), xenon (Xe) or radon (Rn)), and this gas is converted to plasma, so that the above described etching process 22 (radical etching) can be carried out.

In this manner, the deposit 21 is removed through radical etching (etching process 22) without using ion bombardment in the Step S4 where the used etching gas contains a fluorine-based gas. In addition, it is more preferable for the etching gas in the etching process 22 in the Step S4 to further contain oxygen ($O_2$) gas, and when the etching gas contains $O_2$ (oxygen) gas in addition to a fluorine-based gas, such as $CF_4$ gas, it becomes easy for fluorine (F) radicals and fluoride radicals to be generated. A mixed gas of $CF_4$ (carbon tetrafluoride) gas and $O_2$ (oxygen) gas, for example, is used to carry out dry etching (plasma etching) without applying a bias voltage to the semiconductor substrate 1S, and thus, etching process 22 (radical etching) can be carried out in the Step S4. Further, the etching gas may contain a diluted gas in the etching process 22 in the Step S4.

In addition, in the case where the lower electrode wirings M0 are formed by a multilayer film having a titanium nitride film 3c of the top layer, it is preferable to carry out radical etching using a mixed gas of carbon tetrafluoride ($CF_4$) gas and oxygen ($O_2$) gas in the removal of the deposit 21 (etching process 22) in the Step S4, and thus, the deposit 21 can be selectively etched and removed while suppressing or preventing the sidewalls SW (insulating film 4) from being etched. The etching process 22 can be carried out in the Step S4 as a down-flow type isotropic radical etching process using a mixed gas of $CF_4$ gas and $O_2$ gas, for example.

In addition, a tungsten (W) film may be used instead of the titanium nitride film 3c of the top layer of the lower electrode wirings M0, and in this case, the deposit 21 may contain tungsten (W) instead of titanium (Ti). Therefore, in the case where a tungsten film is used instead of the titanium nitride film 3c, the deposit 21, which is a tungsten-based reaction product, is removed in the Step S4, and thus, it is preferable to use sulfur hexafluoride ($SF_6$) gas as the fluorine-based gas in the etching process 22 that is carried out in the Step S4. And as a result, the deposit 21, which is a tungsten-based reaction product, can be selectively etched and removed while suppressing or preventing the sidewalls SW (insulating film 4) from being etched.

In this manner, the etching process 22 for removing the deposit 21 in the Step S4 is carried out as an isotropic radical etching process, and thus, the above described deposit 21 that has deposited on the entire surface of the semiconductor substrate 1S (semiconductor wafer) during the etching in the above described Step S3 can be removed while preventing the sidewalls SW from receding. Here, the upper surface of the lower electrode wirings M0 (upper surface of the titanium nitride film 3c of the top layer) is slightly etched in the etching process 22 in the Step S4, and therefore, the titanium nitride film 3c may be thickly formed in advance according to the amount of etching (amount of shaving) of the titanium nitride film 3c in the etching process 22 in the Step S4. The amount of deposit 21 removed in the etching process 22 in the Step S4 is, for example, equal to or greater than about 20 nm in terms of a flat titanium nitride film.

Though it is possible to consider using a method for wet etching with, for example, a mixed solution of ammonium and hydrogen peroxide solution in the Step S4, in order to remove the deposit 21, in the case where the aluminum film 3b is exposed from a sidewall surface of the lower electrode wirings M0 due to receding of the sidewalls SW, the aluminum film 3b also gets to be corroded or etched, and this case is not preferable. Therefore, in the process for removing the deposit 21 (etching process 22) in the Step S4, radical etching (chemical dry etching) is used instead of the above described wet etching, in order to prevent the aluminum film 3b from being etched.

Next, both the front and rear surfaces (first main surface and second main surface) of the semiconductor substrate 1S (semiconductor wafer) are washed with water or the like (Step S5), and then, a baking process is carried out, for example, at about 150° C. for about 2 minutes, so that the semiconductor substrate 1S (semiconductor wafer) is dried (Step S6).

Figure 20:
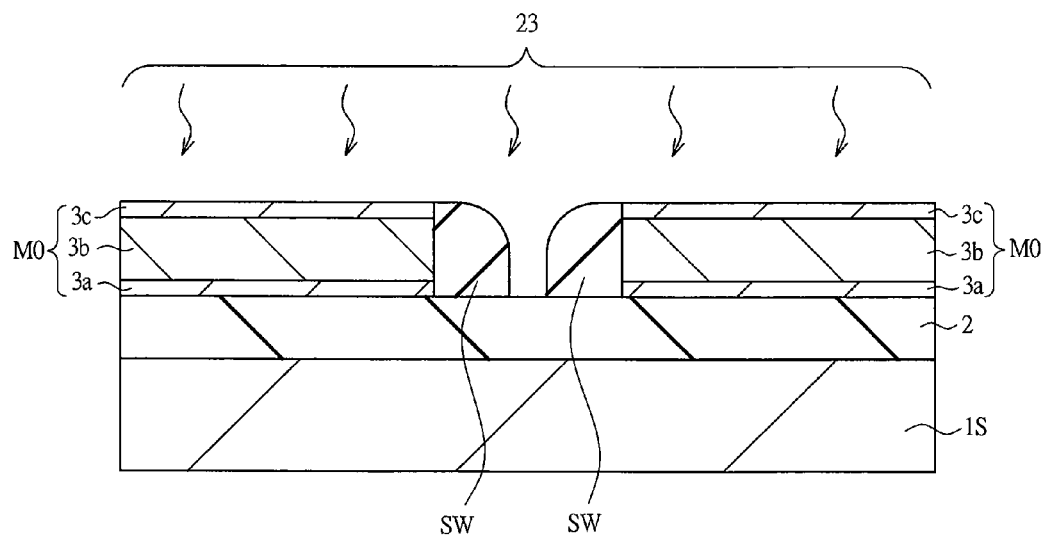
FIG. 20 is a cross sectional view showing the main part of the semiconductor device during the manufacturing process continued from FIG. 19.

Next, as shown in FIG. 20, a nitridation process (nitridation and reduction process, a process for nitriding the upper surface of the lower electrode wirings M0) 23 is carried out on the upper surface (upper surface of the titanium nitride film 3c of the top layer) of the lower electrode wirings M0 (first metal film pattern) (Step S7). The nitridation process 23 can be carried out by exposing the semiconductor substrate 1S (semiconductor wafer) to an $NH_3$ plasma (ammonia plasma) atmosphere. FIG. 20 schematically shows the nitridation process 23. Though not shown, when the process for removing the deposit 21 (isotropic radical etching process) is carried out in Step S4, the carbon component (fluorocarbon-based polymer) that remains on the surface (first main surface) of the semiconductor substrate 1S (semiconductor wafer) is also removed using $NH_x$ radicals in the nitridation process 23 in Step S7. Here, it is preferable for the gas used in the nitridation process 23 in Step S7 to be an $NH_3$ (ammonium) gas, but the gas is not limited to this, and for example, a mixed gas of an $N_2$ (nitrogen) gas and an $H_2$ (hydrogen) gas or a single gas of an $N_2$ (nitrogen) gas may be used. That is to say, the nitridation process 23 in Step S7 can be carried out as a plasma treatment using a gas containing nitrogen (nitrogen element).

Figure 21:
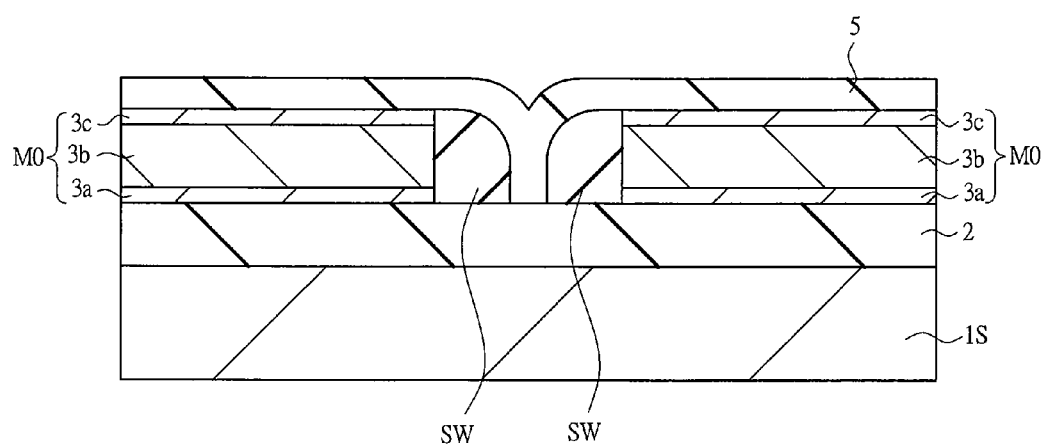
FIG. 21 is a cross sectional view showing the main part of the semiconductor device during the manufacturing process continued from FIG. 20.

Next, as shown in FIG. 21, the insulating film 5 is formed (deposited) on the entirety of the first main surface (i.e., on the insulating film 2) of the semiconductor substrate 1S so as to cover the lower electrode wirings M0 (lower electrodes M0E) and the sidewalls SW (Step S8). The insulating film 5 becomes an insulating film between the lower electrode wirings M0 and the upper electrode wirings M1, which are subsequently formed. The steps after the formation of the insulating film 5 are the same as those described with reference to the above described FIGS. 8 to 14, and therefore, the description thereof is omitted here.

Next, the effects of the present embodiment are described in further detail.

According to the present embodiment, an ultrasonic transmitting and receiving sensor element having an electrostatic variable capacitor is formed using the lower electrode wirings M0 and upper electrode wirings M1. The lower electrode wirings M0 and the upper electrode wirings M1 are formed on the semiconductor substrate 1S, and therefore, it is easy to divide the lower electrode wirings M0 and the upper electrode wirings M1 into a plurality of respective channels so that they can be easily controlled. Therefore, it is easy to implement a 1.5-dimensional array and a two-dimensional array, in addition to a one-dimensional oscillator array.

Further, according to the present embodiment, the lower electrode wirings M0 and the upper electrode wirings M1 can be formed on the semiconductor substrate 1S in the same process as the wiring process in semiconductor processes, and therefore, it is easy to mix other semiconductor elements, for example, a selective switch and a sense amplifier, on the same semiconductor substrate 1S (i.e., within the same semiconductor chip 1).

In addition, according to the present embodiment, the lower electrode wirings M0 (lower electrodes M0E) and the upper electrode wirings M1 (upper electrodes M1E) are formed by aluminum wires as those used in the semiconductor processes, and therefore, the performance of the ultrasonic transmitting and receiving sensor can be improved, by reducing the resistance in the lower electrode wirings M0 and the upper electrode wirings M1.

As can be seen from the above described FIGS. 2 and 3, however, the lower electrode wirings M0 and the upper electrode wirings M1 cross each other (at a right angle) in such a manner that the upper electrode wirings M1 (second metal film pattern) extend so as to cross areas above regions between neighboring lower electrode wirings M0 (first metal film pattern), and thus, the upper electrode wirings M1 stride between neighboring lower electrode wirings M0. In particular, connection portions M1C for connecting between upper electrodes M1E in the upper electrode wirings M1 cross areas above regions between neighboring lower electrode wirings M0. Therefore, there is a possibility that various problems may occur by the steps created by the lower electrode wirings M0.

Figure 22:
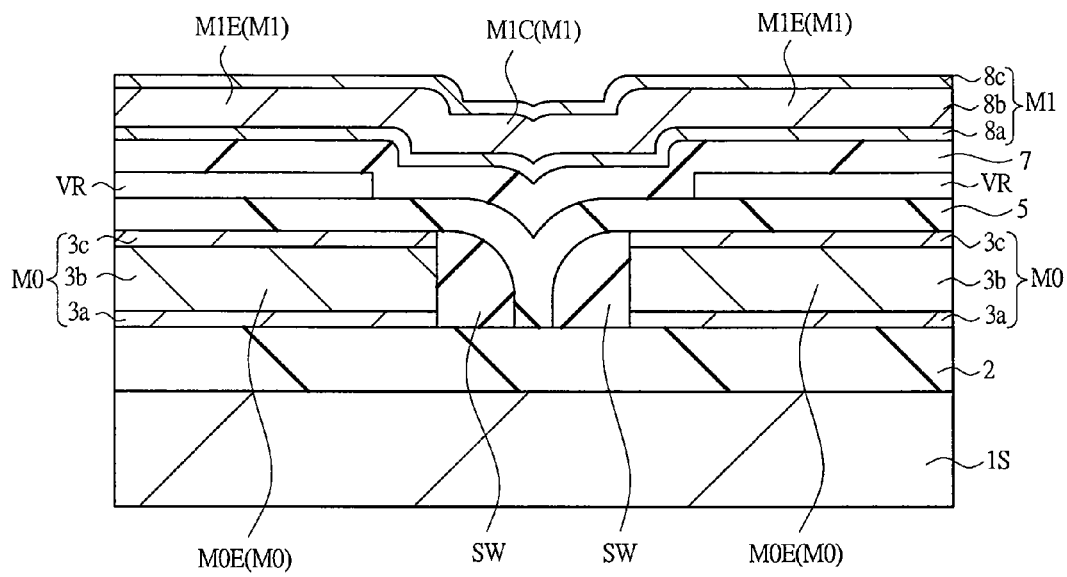
FIG. 22 is a cross sectional view showing a main part of the semiconductor device according to the embodiment of the present invention.
Figure 23:
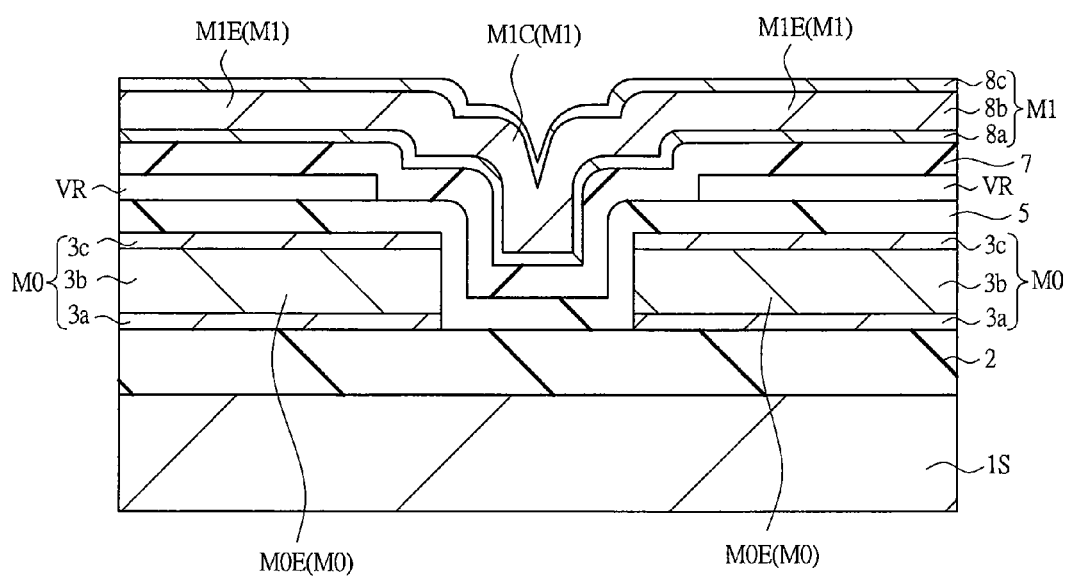
FIG. 23 is a cross sectional view showing a main part of a semiconductor device according to a first comparative example.

FIG. 22 is a cross sectional view showing a main part of the semiconductor device (semiconductor chip 1) according to the present embodiment. FIG. 22 shows the region corresponding to that in the above described FIGS. 16 to 21 (i.e., a cross sectional view showing a portion along the line X2-X2 in the above described FIG. 2), and the structure above the upper electrode wiring M1 is not shown. FIG. 23 is a cross sectional view showing a main part of a semiconductor device according to a first comparative example, and corresponds to FIG. 22 shown in the present embodiment. The first comparative example in FIG. 23 is a case which is different from the present embodiment in that the process for depositing the insulating film 5 is carried out in Step S8 after the formation of the lower electrode wirings M0 in Step S1 without carrying out processes corresponding to Steps S2 to S7, and after that, the same steps as in the present embodiment are carried out. That is to say, no sidewalls SW are formed in the first comparative example shown in FIG. 23.

In the first comparative example of FIG. 23, no sidewalls SW are formed, and therefore, vertical steps (steps created by the sidewalls of the lower electrode wirings M0) are made by the lower electrode wirings M0. Therefore, the respective films after the insulating film 5 are formed in such a manner as to reflect the vertical steps of the lower electrode wirings M0 so that steps are made for the respective films on the upper portion in regions between neighboring lower electrode wirings M0. The thickness of the lower electrode wirings M0 is considerably great (the thickness is, for example, about 600 nm), and therefore, the steps at the upper portion of regions between neighboring lower electrode wirings M0 are considerably great in the first comparative example in FIG. 23.

Therefore, there is a possibility in the first comparative example in FIG. 23 that it may become difficult to pattern the conductor film (multilayer film 8) for the upper electrode wirings M1 in upper portions of regions between neighboring lower electrode wirings M0. Further, even in the case where patterning went well so that the upper electrode wirings M1 could be formed, there is a possibility that the upper electrode wirings M1 (particularly connection portions M1C) may be bent and disconnected in upper portions of regions between neighboring lower electrode wirings M0. In addition, there is a possibility that the coverage of the insulating films 5 and 7 formed between the lower electrode wirings M0 and the upper electrode wirings M1 may become insufficient so that it makes easy for short circuiting and leakage to be caused between the lower electrode wirings M0 and the upper electrode wirings M1, and thus, the withstand voltage between the lower electrode wirings M0 and the upper electrode wirings M1 may be lowered. In addition, there is a possibility that the above described sacrificial pattern 6 may not be completely removed in the vicinity of the vertical steps of the lower electrode wirings, which causes peeling of the pattern. These problems make it difficult to form stable electrostatic variable capacitors with the desired insulating properties, lower the reliability of the capacitance detection type ultrasonic sensor, and lower the manufacturing yield.

In contrast, according to the present embodiment, the above described steps S2 and S3 are carried out after the formation of the lower electrode wirings M0 (lower electrodes M0E) in Step S1, so that sidewalls SW are formed on the sidewalls of the lower electrode wirings M0 (lower electrodes M0E). Therefore, as shown in FIG. 22, there are sidewalls SW between neighboring lower electrodes wirings M0, and these sidewalls SW reduce the height of the vertical steps of the lower electrode wirings M0 so that it is difficult for steps to be made on the respective films in upper portions of regions between neighboring lower electrode wirings M0.

Therefore, according to the present embodiment, it is easy to pattern the conductor film (multilayer film 8) for the upper electrode wirings M1 in upper portions of regions between neighboring lower electrode wirings M0, and the upper electrode wirings M1 (connection portions M1C) can be suppressed or prevented to be bent at upper portions of regions between neighboring lower electrode wirings M0. Accordingly, the upper electrode wirings M1 can be suppressed or prevented from being disconnected. In addition, sidewalls SW are provided on the sidewalls of the lower electrode wirings M0, and therefore, the coverage of the insulating films 5 and 7 formed between the lower electrode wirings M0 and the upper electrode wirings M1 can be increased, and short circuiting and leakage current can be prevented between the lower electrode wirings M0 and the upper electrode wirings M1, and thus, the withstand voltage between the lower electrode wirings M0 and the upper electrode wirings M1 can be increased. In addition, the above described sacrificial pattern 6 can be prevented from remaining after etching. Accordingly, it becomes possible to form stable electrostatic variable capacitors with desired insulating properties, the reliability of the capacitance detection type ultrasonic sensor can be increased, and the manufacturing yield of semiconductor devices can be increased. Here, the buried insulating film 4a in a second embodiment described below also has these effects. Accordingly, the present embodiment and the second embodiment described below have greater effects when applied to the case where the upper electrode wirings M1 (second metal film pattern) extend, so as to cross areas above regions between neighboring lower electrode wirings M0 (first metal film pattern).

Meanwhile, it was found through the study by the inventors of the present invention that the titanium nitride film 3c of the top layer of the lower electrode wirings M0 is shaved (sputtered and etched) through over-etching when etch-back is carried out on the insulating film 4 for the formation of sidewalls SW in Step S3 in order to form sidewalls SW. As a result, the above described deposit 21 is deposited on the entire surface of the semiconductor substrate (semiconductor wafer) 1S.

When Steps S4 to S7 are not carried out after Steps S1 to S3 unlike the present embodiment, a semiconductor device is manufactured with the deposit 21 remained. And in the manufactured semiconductor device, adjacent lower electrode wirings M0 are made to be like connected through the deposit 21 remaining on the sidewalls SW and the insulating film 2. In this case, the deposit 21 contains a metal element as that described above so that it exhibits properties as those of conductors. Consequently, the deposit 21 may become a leakage path (a leakage current path or a conductive path) so that the leakage current between adjacent lower electrode wirings M0 increases, and there is a possibility that the withstand voltage of the insulation between adjacent lower electrode wirings M0 may be lowered due to the existence of deposit 21 between adjacent lower electrode wirings M0. This lowers the reliability of the semiconductor device, and also lowers the manufacturing yield of semiconductor devices.

In contrast, according to the present embodiment, deposit 21 that has deposited on the surface of the semiconductor substrate 1S during the etch-back process of the insulating film 4 in Step S3 is removed through the etching process 22 (radical etching) in Step S4. The deposit 21 on the surface of the sidewalls SW between neighboring lower electrode wirings M0 and the insulating film 2 is removed through the etching process 22 in this Step S4. As a result, no deposit 21 remains on the sidewalls SW between neighboring lower electrode wirings M0 and the insulating film 2 (i.e., between the front surface of the sidewalls SW and the insulating film 2 and the lower surface of the insulating film 5) in the manufactured semiconductor device, and a leakage path can be prevented from being formed between neighboring lower electrode wirings M0 due to the deposit 21. Therefore, the leakage current between neighboring lower electrode wirings M0 can be reduced, and the withstand voltage of the insulation between the lower electrode wirings M0 can be increased. Accordingly, the reliability of the semiconductor device can be increased, and the manufacturing yield of semiconductor devices can also be increased.

Further, unlike the present embodiment, it is also possible in the etch-back process of the insulating film 4 in Step S3 for etching to be completed before the upper surface of the lower electrode wirings M0 (upper surface of the titanium nitride film 3c) is exposed, so that the insulating film 4 remains on the upper surface of the lower electrode wirings M0 (upper surface of titanium nitride film 3c) with the insulating film 4 being incompletely removed from the upper surface of the lower electrode wirings M0 (upper surface of the titanium nitride film 3c). However, when etching an insulating film or the like, it is difficult to control the thickness of the remained insulating film to a predetermined thickness, compared to controlling the thickness of the deposited film to a predetermined thickness when forming an insulating film or the like. Therefore, in the case where the insulating film 4 is left on the upper surface of the lower electrode wirings M0, it is difficult to control the thickness of the insulating film 4 remaining on the upper surface of the lower electrode wirings M0 to a predetermined thickness. Therefore, the film thickness of the insulating film 4 remaining on the lower electrode wirings M0 is inconsistent between the semiconductor wafers. Further, even in the case where a CMP process is carried out on the insulating film 4 instead of etching, it is difficult to control the film thickness of the insulating film 4 remaining on the lower electrode wirings M0 to a predetermined thickness. Accordingly, in the case where the insulating film 4 is left on the upper surface of the lower electrode wirings M0, it is difficult to control the distance between the lower electrodes M0E and the upper electrodes M1E to a predetermined value, and this makes the value of the capacitance of the capacitor elements (oscillators 20) formed by lower electrode wirings M0 (lower electrodes M0E) and upper electrode wirings M1 (upper electrodes M1E) fluctuate from the reference value (designed value). That is to say, the capacitance of the capacitor elements (oscillators 20) formed by lower electrode wirings M0 (lower electrodes M0E) and upper electrode wirings M1 (upper electrodes M1E) varies, depending on the film thickness of the insulating film 4 remaining on the lower electrode wirings M0. Therefore, it is not preferable to leave the insulating film 4 on the upper surface of the lower electrode wirings M0, to take the controllability of the value of the capacitance into consideration.

In contrast, according to the present embodiment, etching (etching on the entire surface) is carried out on the entire surface of the insulating film 4 until the upper surface of the lower electrode wirings M0 (upper surface of titanium nitride film 3c) is exposed in the etch-back process of the insulating film 4 in Step S3. Thus, the insulating film 4 is completely removed from the entirety of the upper surface of the lower electrode wirings M0. As a result, the insulating film 4 does not remain on the upper surface of the lower electrode wirings M0, and therefore, the distance between the lower electrodes M0E and the upper electrodes M1E can be controlled using the film thickness of the deposited insulating film 4, the film thickness of the deposited sacrificial film (polycrystalline silicon film) for the formation of the sacrificial pattern 6 (this corresponds to the thickness in the cavity portions VR), and the film thickness of the deposited insulating film 5. It is easy to control the thickness of the deposited film to a predetermined thickness when an insulating film or the like is formed, compared to the control of the film thickness of the remaining insulating film to a predetermined thickness when an insulating film or the like is etched. Therefore, the distance between the lower electrodes M0E and the upper electrodes M1E can be controlled to a predetermined appropriate distance. Consequently, the value of the capacitance of capacitor elements (oscillators 20) formed by lower electrode wirings M0 (lower electrodes M0E) and upper electrode wirings M1 (upper electrodes M1E) can be prevented from fluctuating from the reference value (designed value), or such fluctuation can be suppressed, thereby making it possible to form oscillators 20 (capacitor elements) following the designed value.

In addition, according to the present embodiment, the problem with the formation of deposit 21 when etch-back (etching on the entire surface) is carried out on the insulating film 4 until the upper surface of the lower electrode wirings M0 (upper surface of the titanium nitride film 3c) is exposed in Step S3 can be solved by removing the deposit 21 in Step S4 as described above.

In this manner, according to the present embodiment, the lower electrode wirings M0 (first metal film pattern) are formed (on the insulating film 2) on the semiconductor substrate 1S in Step S1, and then, the insulating film 4 (first insulating film) is formed on the semiconductor substrate 1S (on the insulating film 2 on the semiconductor substrate 1S) so as to cover the lower electrode wirings M0 (first metal film pattern) in Step S2. After that, etching is carried out on the entire surface of the insulating film 4 in Step S3, and thus, the insulating film 4 (first insulating film) is removed from the upper surface of the lower electrode wirings M0 (first metal film pattern), and portions (here, sidewalls SW) of the insulating film 4 (first insulating film) are left between neighboring lower electrode wirings M0 (first metal film pattern). Then, the deposit 21 (metal-containing deposit) that has deposited on the portion (here, sidewalls SW) of the insulating film 4 (first insulating film) which remains between neighboring lower electrode wirings M0 (first metal film pattern) is removed in Step S4. For the removal (etching process 22) of the deposit 21 (metal-containing deposit) in this Step S4, radical etching is carried out without using ion bombardment. In this manner, the insulating film 4 (here, sidewalls SW) is left between neighboring lower electrode wirings M0, and at the same time, the entirety of the upper surface of the lower electrode wirings M0 can be exposed. Moreover, the deposit 21 that may cause a leakage path subsequently formed is removed so that the reliability of the manufactured semiconductor device can be increased, and the manufacturing yield of semiconductor devices can also be increased.

Figure 24:
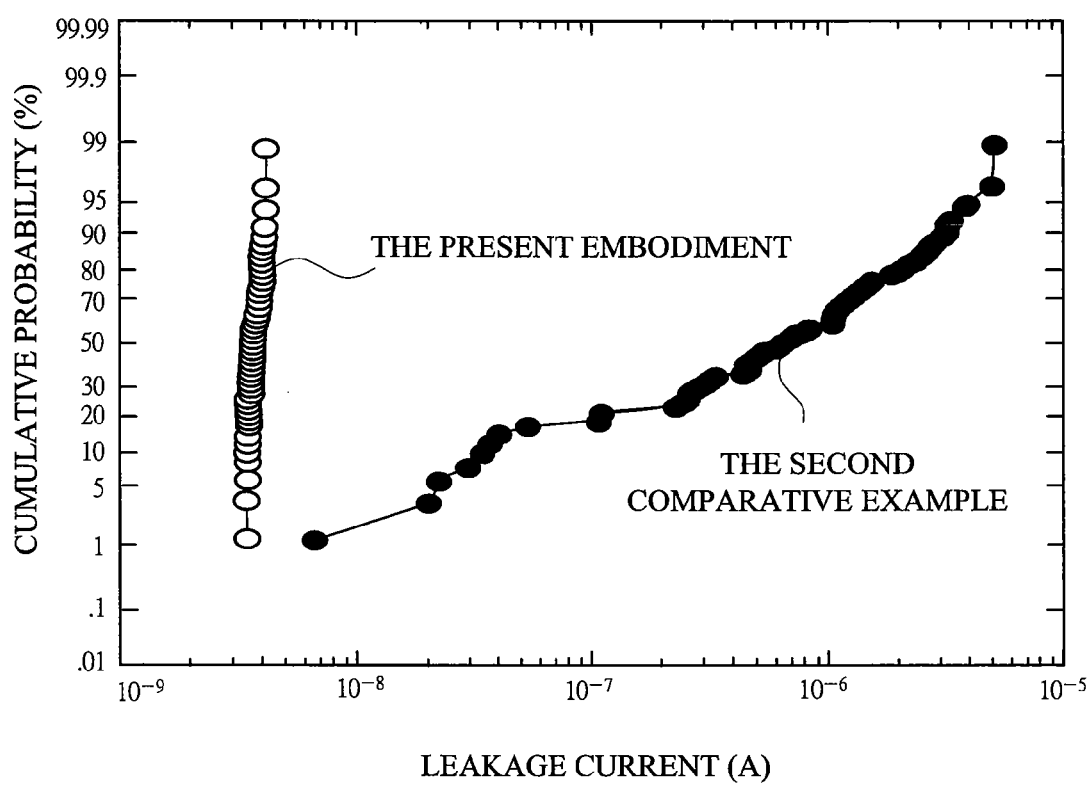
FIG. 24 is a graph showing a leakage current in the semiconductor device according to the embodiment of the present invention and that of a semiconductor device according to a second comparative example.

FIG. 24 is a graph showing a leakage current of the semiconductor device according to the present embodiment and that of the semiconductor device according to the second comparative example. The lateral axis in the graph of FIG. 24 corresponds to the value of the leakage current between adjacent lower electrode wirings M0 when an applied voltage is 100 V, and the longitudinal axis in the graph of FIG. 24 corresponds to cumulative probability. In addition, the graph of FIG. 24 shows data for both a semiconductor device manufactured in the process for removing the deposit 21 through the etching process 22 in Step S4 after the formation of sidewalls SW in Steps S2 and S3 like in the present embodiment (indicated as "the present embodiment" in the graph of FIG. 24), and a semiconductor device manufactured without carrying out the etching process 22 in Step S4 (i.e., without removing the deposit 21) after the formation of sidewalls SW in steps S2 and S3 unlike the present embodiment (indicated as "the second comparative example" in the graph of FIG. 24).

The deposit 21 remains and forms a leakage path in the semiconductor device according to the second comparative example, where the etching process 22 is not carried out in Step S4 after the formation of sidewalls SW in Steps S2 and S3, unlike in the present embodiment. Therefore, as shown in the graph of FIG. 24, the value of the leakage current between adjacent lower electrode wirings M0 is large, and the inconsistency in the value of the leakage current is great. In contrast, the deposit 21 in the semiconductor device according to the present embodiment is removed in the etching process 22 in Step S4 after the formation of sidewalls SW in Steps S2 and S3. Therefore, as shown in the graph of FIG. 24, the value of the leakage current between adjacent lower electrode wirings M0 is small, and the inconsistency in the value of the leakage current can be reduced. That is to say, the process for removing the deposit 21 (etching process 22) may be carried out in Step S4 so that the average value of the leakage current when 100 V is applied can be reduced by about two digits, and the inconsistency can be reduced by about three digits, as compared to the case where no process for removing the deposit 21 is carried out in Step S4.

In this manner, a process for removing a titanium-based reaction product (deposit 21) is carried out on the insulating film 4 (for example, a silicon oxide film) in a highly selective and isotropic manner in Step S3 (Step S3b in the second embodiment described below), and thus, the titanium-based reaction product (deposit 21) having conductivity can be removed without increasing the depth of a recesses (vertical steps) in the insulating film 4 (here, sidewalls SW; in the second embodiment described below, the buried insulating film 4a) remaining between neighboring lower electrode wirings M0. Therefore, the leakage current can be reduced and the withstand voltage in the insulation can be increased. Consequently, electrostatic variable capacitor elements can be formed while preventing the insulating performance from degradation. Accordingly, it becomes possible to increase the performance of the semiconductor device and increase the manufacturing yield.

Further, according to the present embodiment, as described above, the nitridation process 23 is carried out in Step S7 after the process for removing the deposit 21 (etching process 22) in Step S4 and before the process for forming the insulating film 5 in Step S8. The nitridation process 23 in Step S7 is carried out as a plasma treatment using a gas containing a nitrogen (N) element. As a result, the following effects can be obtained.

More particularly, when the titanium nitride film 3c of the top layer of the lower electrode wirings M0 is exposed to the etch-back process in Step S3 and the etching process 22 in Step S4, the surface thereof becomes such a state that the bonds between titanium (Ti) and nitrogen (N) are incomplete, and thus, it becomes easy for the titanium nitride film to be locally oxidized. When this state continues, cores of titanium oxide are generated on the surface of the titanium nitride film 3c, and concavity/convexity cores of titanium oxide are generated. There is a possibility that the concavity/convexity cores of titanium oxide generated on the surface of this titanium nitride film 3c may lower the flatness on the upper surface of the lower electrodes M0 and lower the withstand voltage in the insulation. In addition, there is a possibility that when wet etching is carried out on the sacrificial pattern 6 in order to create cavity portions VR, the etchant may penetrate in the concavity/convexity portions created by the concavity/convexity cores of the above described titanium oxide, and thus, the lower electrode wirings M0 may be corroded. In contrast, according to the present embodiment, even in the case where the bond between titanium (Ti) and nitrogen (N) becomes an incomplete state on the upper surface of the titanium nitride film 3c of the top layer of the lower electrode wirings M0 in the etch-back process in Step S3 and the etching process 22 in Step S4, and it becomes easy for the titanium nitride film to be locally oxidized, the upper surface of the titanium nitride film 3c of the top layer of the lower electrode wirings M0 can be nitrided (reduced) by carrying out the nitridation process 23 in Step S7, thereby densely nitriding the upper surface of the titanium nitride film 3c. Therefore, cores (concavity/convexity cores) of titanium oxide can be prevented from being generated on the surface of the titanium nitride film 3c. Accordingly, the flatness on the upper surface of the lower electrode wirings M0 can be improved, and the withstand voltage in the insulation can be increased. Further, when wet etching is carried out on the sacrificial pattern 6 in order to create the cavity portions VR, the etchant can be prevented from penetrating into and corroding the lower electrode wirings M0.

In addition, it is preferable not to carry out an oxygen plasma treatment after the process for removing the deposit 21 (etching process 22) in Step S4 and before the nitridation process 23 in Step S7. In the case where an oxygen plasma treatment (e.g., a plasma treatment using a single gas of oxygen ($O_2$) gas) is carried out after the process for removing the deposit 21 (etching process 22) in Step S4 and before the nitridation process 23 in Step S7, unlike in the present embodiment, the surface of the titanium nitride film 3c of the top layer of the lower electrode wirings M0 is oxidized. Thus, concavity/convexity cores of titanium oxide are generated, and therefore, even when the nitridation process 23 in Step S7 is carried out afterwards, it is difficult to eliminate the concavity/convexity cores of titanium oxide from the surface of the titanium nitride film 3c of the top layer of the lower electrode wirings M0. Therefore, according to the present embodiment, the nitridation process 23 in Step S7 is carried out without carrying out an oxygen plasma treatment (e.g., a plasma treatment using a single gas of oxygen ($O_2$) gas) after the process for removing the deposit 21 (etching process 22) is carried out in Step S4. Accordingly, concavity/convexity cores of titanium oxide can be prevented from being generated through oxidation on the surface of the titanium nitride film 3c of the top layer of the lower electrode wirings M0 more adequately.

In this manner, when the surface of the titanium nitride film 3c of the top layer of the lower electrode wirings M0 is exposed to the etch-back process on the insulating film 4 and the process for removing the titanium-based reaction product (deposit 21) (etching process 22), the quality changes to such a state that it is easy for the titanium nitride film to be locally oxidized, but the surface is densely nitrided by carrying out the nitridation process 23 (nitridation and reducing process) in Step S7. Therefore, concavity/convexity cores of titanium oxide can be prevented from being generated.

In addition, the nitridation process 23 in Step S7 has the following effects.

That is to say, a gas of which the component elements are carbon (C) and fluorine (F) (e.g., $CF_4$ gas or $CHF_3$ gas) is used as an etching gas in the etch-back process of the insulating film 4 in Step S3, and therefore, a fluorocarbon-based polymer containing carbon (C) and fluorine (F), in addition to the deposit 21 containing a metal element (here, Ti), is deposited (adheres) on the entire surface of the semiconductor substrate 1S (semiconductor wafer) during the etch-back process in Step S3. Though this fluorocarbon-based polymer is largely removed in the etching process 22 in Step S4, there is a possibility that some portions may not be removed, and remain after the etching process 22 is carried out in Step S4. In addition, a gas of which the component elements are carbon (C) and fluorine (F) (e.g., $CF_4$ gas) is also used as an etching gas in the etching process in Step S4, and therefore, there is a possibility that a fluorocarbon-based polymer may be deposited during the etching process 22 in Step S4. Therefore, there is a possibility that a fluorocarbon-based polymer may be deposited on the semiconductor substrate 1S (semiconductor wafer) after the step for removing the deposit 21 (etching process 22) in Step S4. The deposit 21 containing a metal element (here, Ti) easily forms a leakage path due to the metal element, while the fluorocarbon-based polymer does not contain a metal element barely affects the leakage current. However, the fluorocarbon-based polymer contains fluorine, and therefore, it is preferable to remove it in order to improve the reliability (adhesiveness of the insulating film 5 in Step S8). According to the present embodiment, a plasma treatment using a gas containing a nitrogen (N) element, more preferably a plasma treatment using an ammonium ($NH_3$) gas (ammonium plasma treatment) is carried out as the nitridation process 23 in Step S7, and thus, the above described fluorocarbon-based polymer can be removed using radicals (nitride radicals, such as nitrogen radicals or $NH_x$ radicals) formed during the nitridation process in Step S7.

In this manner, a nitridation (reduction) process and a process for removing a fluorocarbon-based polymer can be carried out on the upper surface of the titanium nitride film 3c of the top layer of the lower electrode wirings M0 as the nitridation process 23 in Step S7. Accordingly, the reliability of the manufactured semiconductor device can be further improved. In addition, the nitridation process 23 in Step S7 is more effective in the case where the lower electrode wirings M0 (first metal film pattern) are made of a multilayer film having the titanium nitride film 3c (metal nitride film) for the top layer.

Next, a case where the semiconductor device (semiconductor chip 1) according to the present embodiment is applied to, for example, an ultrasonic diagnosing apparatus is described.

Figure 25:
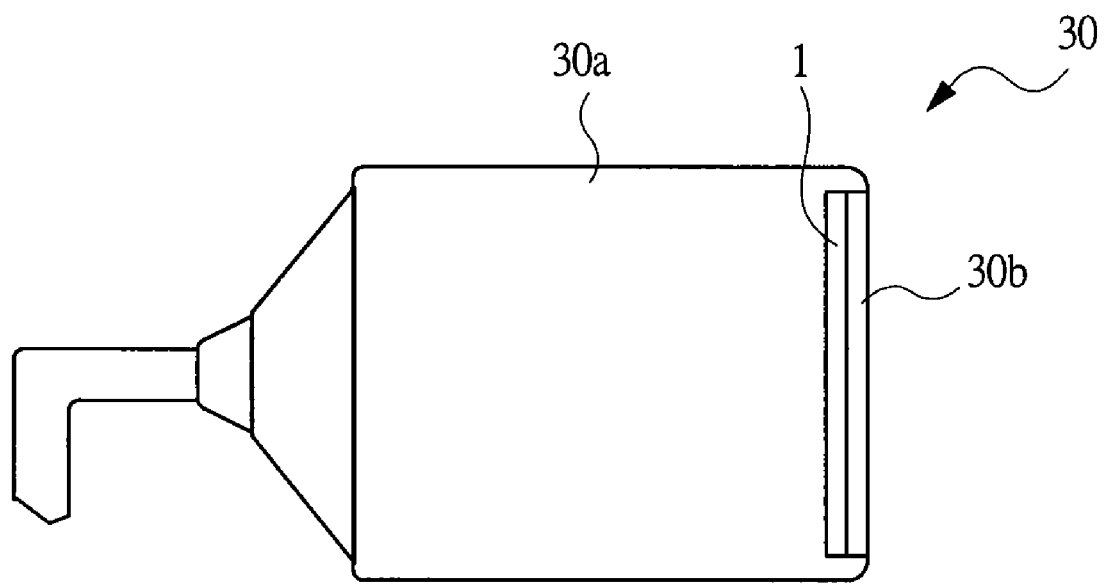
FIG. 25 is an illustrative diagram showing a probe of an ultrasonic diagnosing apparatus to which the semiconductor device according to the embodiment of the present invention is applied.

Ultrasonic diagnosing apparatuses are medical diagnosing apparatuses in which the permeability of sound waves is used and an image of the inside of biological body, which cannot be seen from the outside, is made visible in real time using ultrasonic waves exceeding the audible range. The probe of such ultrasonic diagnosing apparatuses is shown in FIG. 25.

The probe 30 is a member for transmitting and receiving ultrasonic waves. As shown in FIG. 25, the semiconductor chip 1 described above is attached to an end surface of the probe case 30a which forms the probe 30 where a first main surface thereof (surface on which a plurality of oscillators 20 are formed) faces outward. Further, an acoustic lens 30b is attached to this semiconductor chip 1 on the first main surface side.

When an ultrasonic diagnosis is carried out, the tip (acoustic lens 30b side) of the above described probe 30 is made to have contact with the surface of the body, and after that, the position is gradually shifted little by little while scanning. At this time, an ultrasonic pulse of several MHz is transmitted into the biological body from the probe 30 which is in contact with the surface of the body, and waves reflected by the tissue boundaries between organs having different acoustic impedances (echoes) are received. As a result, cross sectional images of organs in the biological body are obtained so that information on the object can be acquired. Information on the distance between reflector can be obtained on the basis of the time intervals between transmitting and receiving of the ultrasonic waves. In addition, information on the state and quality of the reflector can be obtained from the level and the outer shape of the reflected waves.

The semiconductor chip 1 according to the present embodiment is used for the probe 30 in such an ultrasonic diagnosing apparatus, and thus, the reliability of the probe 30 can be improved, and the life of product can be prolonged.

Second Embodiment

Figure 26:
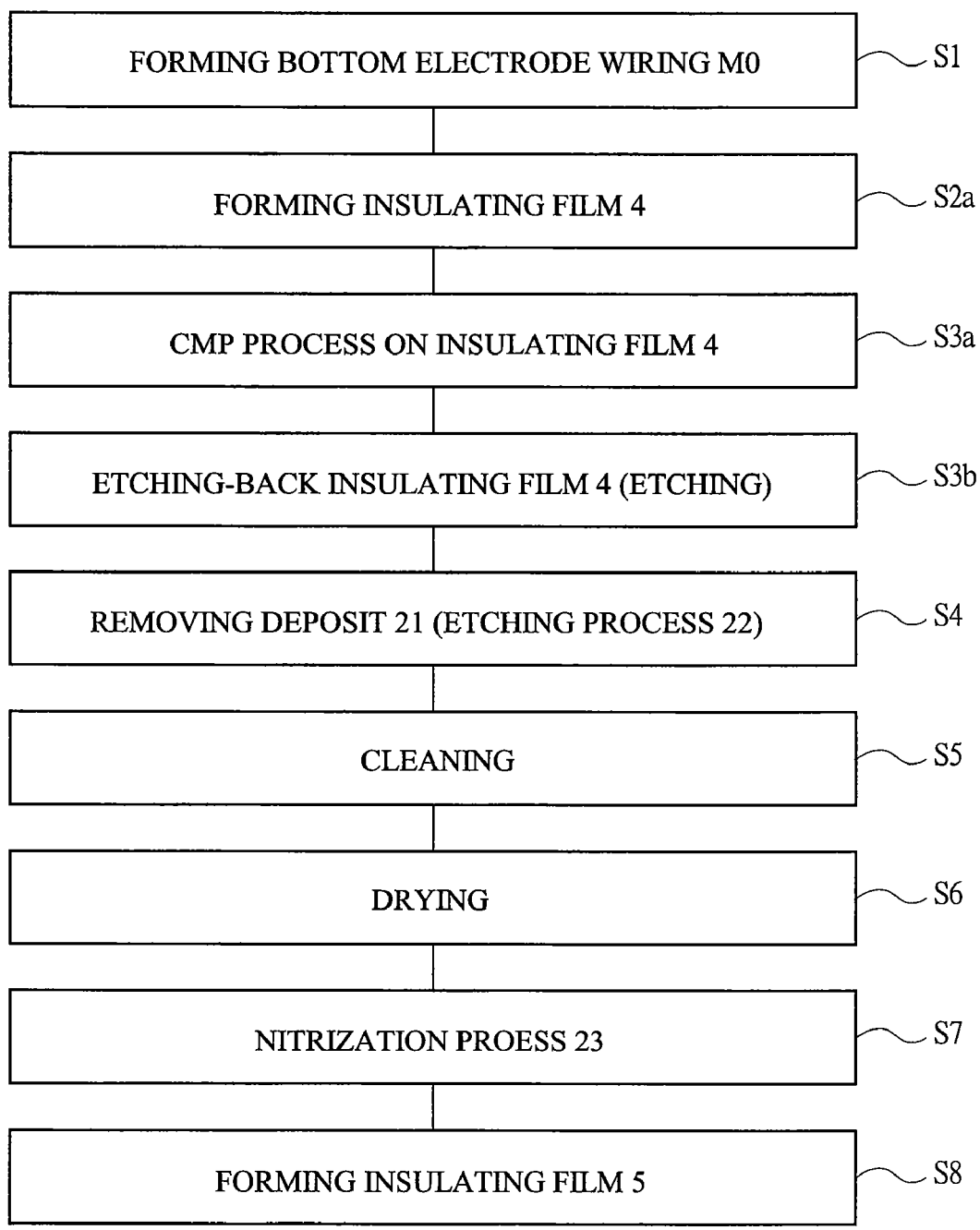
FIG. 26 is a flow chart of a manufacturing process which partially shows manufacturing steps of a semiconductor device according to another embodiment of the present invention.

FIG. 26 is a flow chart of the manufacturing process which partially shows manufacturing steps of the semiconductor device according to the present embodiment, which corresponds to FIG. 15 of the above described first embodiment. FIGS. 27 to 32 are cross sectional views showing a main portion during the process for manufacturing the semiconductor device according to the present embodiment and correspond to FIGS. 17 to 21 of the above described first embodiment. In other words, FIGS. 27 to 32 are cross sectional views showing the part corresponding to that along the line X2-X2 of the above described FIG. 2.

a portion of the insulating film 4 is left between neighboring lower electrode wirings M0 (first metal film pattern) as a buried insulating film 4*a* according to the present embodiment, while portions of the insulating film 4 are left on the sidewalls of the lower electrode wirings M0 (first metal film pattern) as the sidewall insulating films (sidewalls SW) according to the above described first embodiment. Accordingly, the buried insulating film 4*a* in the present embodiment corresponds to the sidewalls SW in the above described first embodiment.

The manufacturing process for the semiconductor device according to the present embodiment is the same as that of above described first embodiment up to the step of forming the lower electrode wirings M0 (Step S1), and therefore, the descriptions thereof will be omitted.

Figure 27:
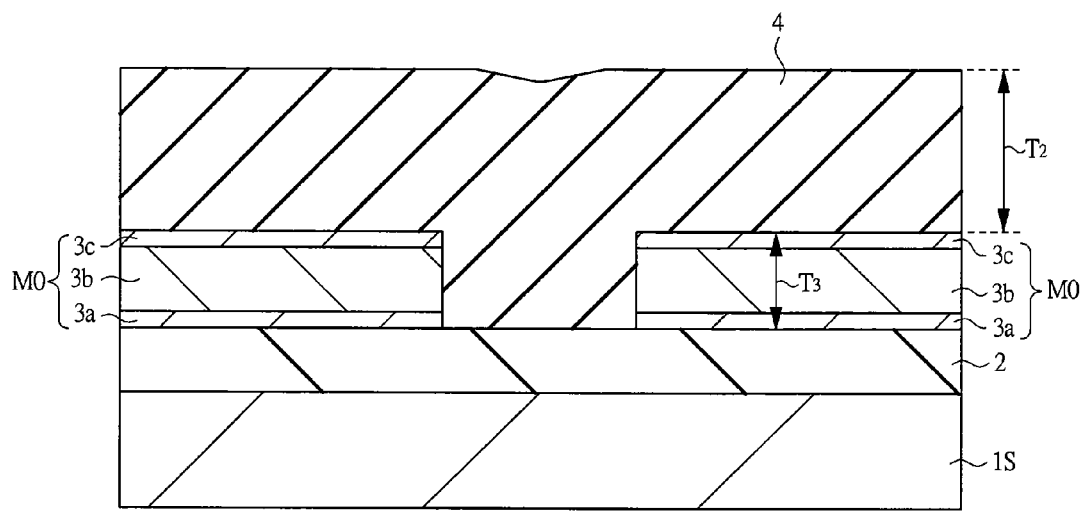
FIG. 27 is a cross sectional view showing the main part of the semiconductor device during the manufacturing process continued from FIG. 26.

In the same manner as in the above described first embodiment and as shown in FIG. 27, the insulating film 4 is formed (deposited) on the semiconductor substrate 1S (on the insulating film 2 on the semiconductor substrate 1S) so as to cover the lower electrode wirings M0, after the structure of the above described FIG. 16 (FIG. 5) is obtained, according to the present embodiment (Step S2*a*). Though the material of and the method for forming the insulating film 4 are the same as the above described first embodiment, the thickness of the insulating film 4 (deposition thickness) $T_2$ is equal to or larger than half the distance $D_1$ between neighboring lower electrode wirings M0 (i.e., $T_2 \geq D_1/2$) according to the present embodiment. In addition, it is more preferable for the thickness of the insulating film 4 (deposition thickness) $T_2$ to be equal to or larger than two times the thickness $T_3$ of the lower electrode wirings M0 (i.e., $T_2 \geq 2T_3$). The distance $D_1$ between neighboring lower electrode wirings M0 is, for example, about 2 μm in the same manner as the above described first embodiment. And the thickness $T_3$ of the lower electrode wirings M0 is, for example, about 600 nm in the same manner as the above described first embodiment. Therefore, the thickness $T_2$ of the insulating film 4 may be, for example, about 1500 nm.

Figure 28:
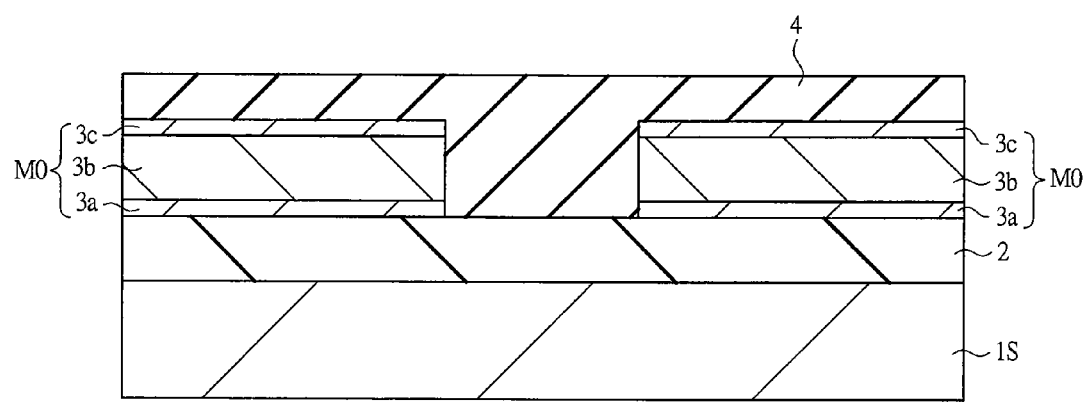
FIG. 28 is a cross sectional view showing the main part of the semiconductor device during the manufacturing process continued from FIG. 27.

Next, a CMP (chemical mechanical polishing) process is carried out on the insulating film 4 (Step S3*a*). That is to say, in Step S3*a*, the upper portion of the insulating film 4 is removed through chemical mechanical polishing (CMP process). As a result of the CMP process in this Step S3*a*, as shown in FIG. 28, the upper portion of the insulating film 4 is removed and a flat upper surface of the insulating film 4 is obtained. At the time of the CMP process in this Step S3*a*, the CMP process is completed before the upper surface of the lower electrode wirings M0 (i.e., the upper surface of the titanium nitride film 3*c* of the top layer) is exposed. Therefore, even when the CMP process is carried out in Step S3*a*, the insulating film 4 remains on the upper surface of the lower electrode wirings M0, and the upper surface of the lower electrode wirings M0 will not be exposed. As described above, in the case where the deposition thickness of the insulating film 4 is about 1500 nm, the amount (thickness) by which the insulating film 4 is polished off (removed) during the CMP process in Step S3*a* may be about 1200 nm in terms of the thickness. Therefore, the insulating film 4 having a thickness of, for example, about 300 nm remains on the upper surface of the lower electrode wirings M0.

Figure 29:
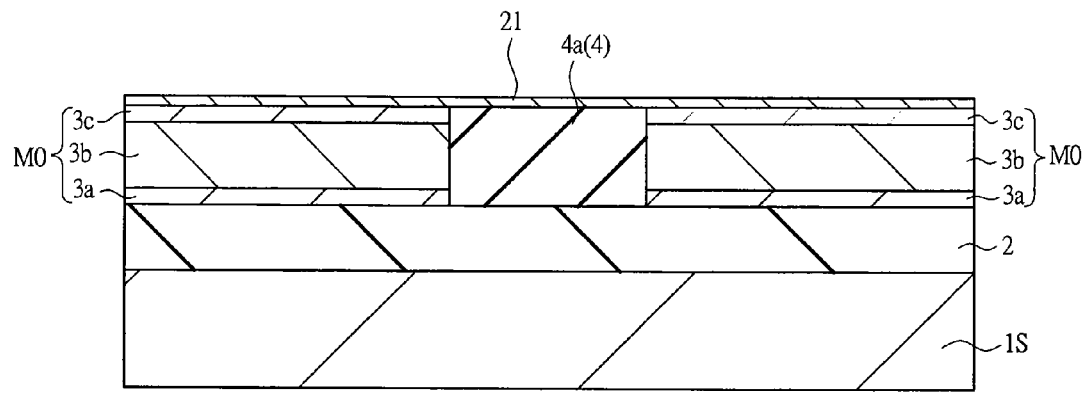
FIG. 29 is a cross sectional view showing the main part of the semiconductor device during the manufacturing process continued from FIG. 28.

Next, as shown in FIG. 29, etch-back (etching on the entire surface) is carried out on the insulating film 4 until the upper surface of the lower electrode wirings M0 (upper surface of the titanium nitride film 3*c* of the top layer) is exposed (Step S3*b*). As a result of the etch-back in this Step S3*b*, the insulating film 4 on the upper surface of the lower electrode wirings M0 is completely removed so that the entirety of the upper surface of the lower electrode wirings M0 (upper surface of the titanium nitride film 3*c* of the top layer) is exposed, and at the same time, the insulating film 4 is left between neighboring lower electrode wirings M0. The insulating film 4 remaining between neighboring lower electrode wirings M0 becomes the buried insulating film 4*a*.

In other words, in Step S3*b*, etching is carried out on the entire surface (entirety of the upper surface or the entirety of the main surface) of the insulating film 4, and thus, the insulating film 4 is removed from the upper surface of the lower electrode wirings M0 (first metal film pattern) and a portion of the insulating film 4 (here, buried insulating films 4*a*) is left between neighboring lower electrode wirings M0 (first metal film pattern). As a result, in Step S3*b*, the gap between neighboring lower electrode wirings M0 (first metal film pattern) are filled with the remaining insulating film 4 (here, buried insulating film 4*a*).

In addition, in the etch-back process of the insulating film 4 in Step S3*b*, etching is carried out on the entire surface of the insulating film 4 (i.e., the entire surface of the insulating film 4 is etched) without using an etching mask, such as a photoresist film, and thus, a portion of the insulating film 4 is left between neighboring lower electrode wirings M0 as the buried insulating film 4*a*, and the remaining insulating film 4 (other than the buried insulating film 4*a*) is removed so that the insulating film 4 is completely removed from the entirety of the upper surface of the lower electrode wirings M0.

Though there is a possibility that the gap between the neighboring lower electrode wirings M0 may not be well filled with the buried insulating film 4*a* when etch-back is carried out on the insulating film 4 in Step S3*b* in the case where the deposition thickness (the above described thickness $T_2$) of the insulating film 4 is too small in Step S2*a*, the deposition thickness (the above described thickness $T_2$) of the insulating film 4 in Step S2*a* is equal to or larger than half the distance $D_1$ between neighboring lower electrode wirings M0 (i.e., $T_2 \geq D_1/2$), so that the gap between neighboring lower electrode wirings M0 can be filled with buried insulating film 4*a* when etch-back is carried out in Step S3*b*.

Though it is also possible to carry out the CMP process in Step S3*a* until the upper surface of the lower electrode wirings M0 is exposed, so that the etch-back process of the insulating film 4 in Step S3*b* can be omitted unlike in the present embodiment, in that case, a problem arises where the surface of the lower electrode wirings M0 is scratched and dishing occurs in portions where there are no lower electrode wirings M0, and thus, it makes manufacturing with high precision difficult.

In contrast, according to the present embodiment, the CMP process is completed before the upper surface of the lower electrode wirings M0 is exposed in Step S3a, and the entire surface of the insulating film 4 is etched in the subsequent Step S3b, and thus, the insulating film 4 is removed from the upper surface of the lower electrode wirings M0 and the buried insulating film 4a is left between neighboring lower electrode wirings M0. As a result, no such problem as scratching or dishing caused by the CMP process arises, and it becomes possible to remove the insulating film 4 from the entirety of the upper surface of the lower electrode wirings M0, and to form the buried insulating films 4a.

Further, it is possible to form the insulating film 5 in a state where the insulating film 4 remains on the upper surface of the lower electrode wirings M0 when Step S3b is not carried out after the completion of the CMP process before the upper surface of the lower electrode wirings M0 is exposed in Step S3a, or use the remaining insulating film 4 as the insulating film 5, unlike in the present embodiment. In that case, however, it is difficult to control the film thickness of the insulating film 4 remaining on the upper surface of the lower electrode wirings M0 to a predetermined thickness, and the capacitance of the capacitor elements (oscillators 20) varies depending on the film thickness of the insulating film 4 remaining on the lower electrode wirings M0. Therefore, it is not preferable to leave the insulating film 4 on the upper surface of the lower electrode wirings M0, taking the controllability of the capacitance value into consideration.

In contrast, according to the present embodiment, the CMP process is completed before the upper surface of the lower electrode wirings M0 is exposed in Step S3a, and etching is carried out until the upper surface of the lower electrode wirings M0 (upper surface of the titanium nitride film 3c) is exposed in the subsequent Step S3b so that the insulating film 4 is completely removed from the entirety of the upper surface of the lower electrode wirings M0 (upper surface of the titanium nitride film 3c). As a result, the distance between the lower electrodes M0E and the upper electrodes M1E can be controlled to a predetermined distance adequately. Therefore, the capacitance value of the capacitor elements (oscillators 20) formed of lower electrode wirings M0 (lower electrodes M0E) and upper electrode wirings M1 (upper electrodes M1E) can be prevented from fluctuating from the reference value (designed value), or such a fluctuation can be suppressed. Therefore, it becomes possible to form oscillators 20 (capacitor elements) meeting the designed value. Further, even in the case where the film thickness of the insulating film 4 remaining after the CMP process cannot be controlled precisely in Step S3a, the insulating film 4 can be completely removed from the upper surface of the lower electrode wirings M0 (upper surface of the titanium nitride film 3c) by slightly over-etching the insulating film 4 in Step S3b. Moreover, the problem of the deposit 21, which is formed when the insulating film 4 is etched until the upper surface of the lower electrode wirings M0 (upper surface of the titanium nitride film 3c) is exposed in Step S3b, can be solved through the process for removing the deposit 21 (etching process 22) in the subsequent Step S4 in the same manner as above described first embodiment.

In addition, according to the present embodiment, though steps are formed on the surface of the insulating film 4 deposited in Step S2a in accordance with the pattern of the lower electrode wirings M0 formed in Step S1, the surface of the insulating film 4 is polished and flattened through the CMP process in Step S3a, and then, the etch-back process of the insulating film 4 is carried out in Step S3b. Therefore, the buried insulating film 4a between neighboring lower electrode wirings M0 can be flattened compared to the case where etch-back is carried out in Step S3b without carrying out Step S3a. And thus, the flatness of the respective films above the insulating film 4a can be further improved.

According to the present embodiment, the insulating film 4 can be etched through the etch-back process in Step S3b in similar manner as the insulating film 4 which is etched through the etch-back process in Step S3 according to the above described first embodiment. Therefore, the detailed description thereof is omitted here. The etching process of the insulating film 4 can be carried out in Step S3b in accordance with a parallel-plate type anisotropic RIE (reactive ion etching) method using a mixed gas of, for example, $CF_4$ gas, $CHF_3$ gas and Ar gas as the etching gas.

In the same manner as the etch-back process of the insulating film 4 in Step S3 according to the above described first embodiment, the upper surface of the lower electrode wirings M0 (upper surface of the titanium nitride film 3c of the top layer) is sputtered when the upper surface of the lower electrode wirings M0 (upper surface of the titanium nitride film 3c of the top layer) is exposed, also in the etch-back process of the insulating film 4 in Step S3b according to the present embodiment. And as schematically shown in FIG. 29, a deposit containing the metal element (a metal-containing deposit, a reaction product, or a titanium-based reaction product) 21 is deposited on the entire surface (i.e., the surface of the lower electrode wirings M0 and the buried insulating film 4a) of the semiconductor substrate 1S (semiconductor wafer). The components of the deposit 21 and what makes them deposited are similar to the above described first embodiment, and thus, the detailed description thereof is omitted here.

Figure 30:
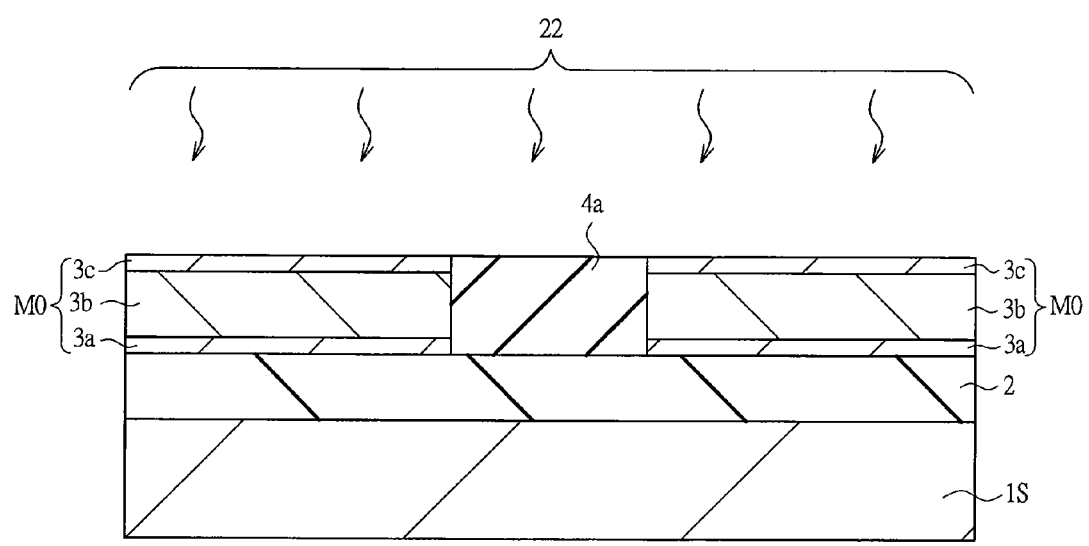
FIG. 30 is a cross sectional view showing the main part of the semiconductor device during the manufacturing process continued from FIG. 29.

The subsequent process is the same as the above described first embodiment. More particularly, the above described deposit 21 which has deposited on the surface of the semiconductor substrate 1S during the etching process of the insulating film 4 in Step S3b is removed through the etching process 22 in Step S4, as shown in FIG. 30.

As described above, the deposit 21 that has deposited during etching in Step S3b is also deposited on the insulating film 4 (here, the buried insulating film 4a) remaining between neighboring lower electrode wirings M0. Therefore, the deposit 21 (metal-containing deposit) deposited on the insulating film 4 (here, buried insulating film 4a) remaining between neighboring lower electrode wirings M0 (first metal film pattern) can also be removed through the etching process 22 in Step S4.

In the same manner as the above described first embodiment, in the case where a semiconductor device is manufactured with the deposit 21 that has deposited on the buried insulating film 4a remained, the deposit 21 on the buried insulating film 4a becomes a leakage path, and the leakage current between neighboring lower electrode wirings increases. Further, there is a possibility that the withstand voltage in the insulation between adjacent lower electrode wirings M0 may be lowered. Therefore, in the same manner as the above described first embodiment, the deposit 21 that has deposited on the surface of the semiconductor substrate 1S during the etch-back process of the insulating film 4 in Step S3b is removed through the etching process 22 in Step S4 according to the present embodiment. As a result of the etching process 22 in this Step S4, the deposit 21 is removed from the surface of the buried insulating film 4a between neighboring lower electrode wirings M0. As a result, in the manufactured semiconductor device, no deposit 21 remains on the buried insulating film 4a (i.e., between the upper surface of the buried insulating films 4a and the lower surface of the insulating film 5) between neighboring lower electrode wirings M0, and a leakage path can be prevented from being formed between adjacent lower electrode wirings M0 due to the deposit 21. Therefore, the leakage current between adjacent lower electrode wirings M0 can be reduced, and in addition, the withstand voltage in the insulation between adjacent lower electrode wirings M0 can be increased. Accordingly, the reliability of the semiconductor device can be improved, and the manufacturing yield of semiconductor devices can also be improved.

The etching process 22 in Step S4 according to the present embodiment can be carried out in similar manner as the etching process 22 in Step S4 according to the above described first embodiment, and therefore, the detailed descriptions thereof will be described here. The etching process 22 in Step S4 can be carried out as a down-flow type isotropic radical etching process using a mixed gas of, for example, $CF_4$ gas and $O_2$ gas. In the etching process 22, the deposit 21 can be selectively etched and removed while preventing the buried insulating film 4a from being etched, or suppressing etching thereof.

The etching process 22 for removing the deposit 21 may be carried out by an isotropic radical etching process in Step S4, so that it becomes possible through etching in Step S3b to remove the deposit 21 that has deposited on the entire surface of the semiconductor substrate 1S (semiconductor wafer) while preventing the buried insulating film 4a from receding. Here, the upper surface of the lower electrode wirings M0 (upper surface of the titanium nitride film 3c of the top layer) is also slightly etched through the etching process 22 in Step S4, and therefore, the titanium nitride film 3c may be thickly formed in advance in accordance with the amount of etching (amount of shaving) of the titanium nitride film 3c through the etching process 22 in Step S4.

Next, in the same manner as the above described first embodiment, both surfaces, front and rear, of the semiconductor substrate 1S (semiconductor wafer) are washed with water in Step S5, and a baking process is carried out, for example, at about 150° C for two minutes in Step S6 so that the semiconductor substrate 1S (semiconductor wafer) is dried.

Figure 31:
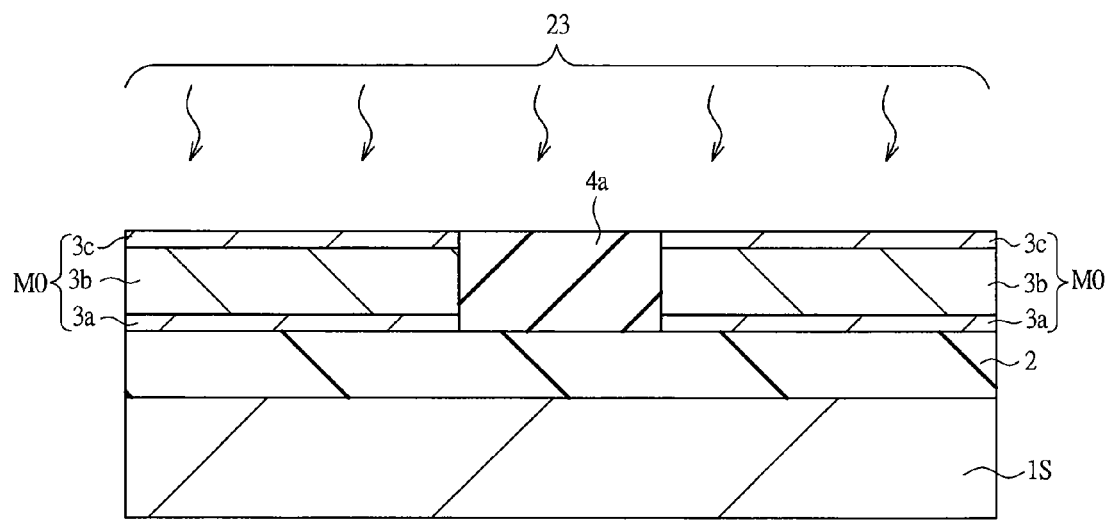
FIG. 31 is a cross sectional view showing the main part of the semiconductor device during the manufacturing process continued from FIG. 30.

Next, in the same manner as the above described first embodiment and as shown in FIG. 31, the nitridation process 23 is carried out in Step 7. According to the present embodiment, the nitridation process 23 can be carried out in Step S7 in similar manner as the nitridation process 23 in Step S7 according to the above described first embodiment. Therefore, the detailed description thereof is omitted here. The semiconductor substrate 1S (semiconductor wafer) is exposed to, for example, an $NH_3$ plasma (ammonium plasma) atmosphere, and thus, the nitridation process 23 can be carried out on the upper surface of the lower electrode wirings M0 (upper surface of the titanium nitride film 3c of the top layer). As a result of the nitridation process 23 in Step S7, similar effects as those in the above described first embodiment can be obtained, but the description thereof is omitted here.

Figure 32:
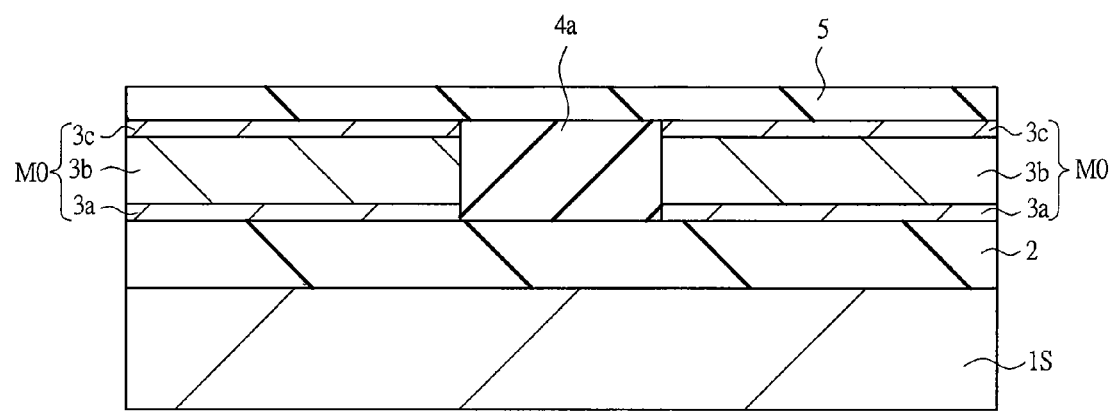
FIG. 32 is a cross sectional view showing the main part of the semiconductor device during the manufacturing process continued from FIG. 31.

Next, in the same manner as in the above described first embodiment and as shown in FIG. 32, the insulating film 5 is formed (deposited) on the entirety of the first main surface (i.e., on the insulating film 2) of the semiconductor substrate 1S, so as to cover the lower electrode wirings M0 (lower electrodes M0E) and the buried insulating film 4a in Step S8.

The material of and the method for forming the insulating film 5 are the same as those in the above described first embodiment. The process after the formation of the insulating film 5 is the same as that described in the above first embodiment with reference to the above described FIGS. 8 to 14, thus, the description thereof is omitted here.

Similar effects as those in the above described first embodiment can be obtained from the present embodiment.

Furthermore, according to the present embodiment, the gap between neighboring lower electrode wirings M0 are filled with the buried insulating film 4a (remaining insulating film 4). Therefore, the upper surface of the buried insulating film 4a and the upper surface of the lower electrode wirings M0 can be made at similar height. Thus, steps caused by the lower electrode wirings M0 are eliminated, and the flatness of the respective films above regions between adjacent lower electrode wirings M0 can further be improved. Accordingly, it becomes distinctly easy to pattern the conductor film (multilayer film 8) for the upper electrode wirings M1. Further, the upper electrode wirings M1 (connection portions M1C) can be prevented from being bent above the region between adjacent lower electrode wirings M0 more adequately. Further more, the coverage of the insulating films 5 and 7 formed between the lower electrode wirings M0 and the upper electrode wirings M1 can be further improved. In addition, the above described sacrificial pattern 6 can be prevented from remaining after etching more adequately. As a result, disconnection in the upper electrode wirings M1 and lowering of the withstand voltage between the lower electrode wirings M0 and the upper electrode wirings M1 can be prevented more adequately so that the reliability of the semiconductor device can be further improved, and the manufacturing yield of semiconductor devices can also be further increased.

Moreover, in the case of the above described first embodiment, sidewalls SW can be formed only through etching (etch-back process in Step S3) after the insulating film 4 is deposited. Therefore, the number of manufacturing steps can be reduced. In addition, in the case of the above described first embodiment, the deposition thickness of the insulating film 4 in Step S2 is relatively small, and thus, the time required for the formation of the insulating film 4 can be shortened so that the manufacturing time for the semiconductor device can be shortened thereby increasing throughput.

In the foregoing, the invention made by the inventors of the present invention has been concretely described based on the embodiments. However, it is needless to say that the present invention is not limited to the foregoing embodiments and various modifications and alterations can be made within the scope of the present invention.

In the foregoing, though the invention made by the inventors of the present invention is described mainly in the case where it is applied to a method for manufacturing a semiconductor device having an ultrasonic sensor in the application field, which is the background of the invention, the invention is not limited to these, but a variety of applications are possible. The invention can be applied to methods for manufacturing various semiconductor devices, for example, having such steps that an insulating film is formed so as to cover a metal film pattern (e.g., wirings) formed on a semiconductor substrate, and after that, etching is carried out on the entire surface of this insulating film. As a result, the insulating film on the upper surface of the metal film pattern is removed, and portions of this insulating film are left between neighboring portions in the metal film pattern.

The case where the cavity portion VR intervenes between the lower electrode wiring M0 and the upper electrode wiring M1 is described in the above described first and second embodiments. However, the present invention can be applied to a case where, for example, the cavity portion VR does not intervene between the lower electrode wiring M0 and the upper electrode wiring M1. And in this case, the insulating film 5 is formed in Step S8, and after that, the formation of the sacrificial pattern 6 and the insulating film 7 will be omitted, and a wiring corresponding to the upper electrode wiring M1 may be formed on the insulating film 5.

The present invention is suitable when applied to manufacturing technologies for semiconductor devices.

What is claimed is:

1. A method for manufacturing a semiconductor device comprising the steps of:
   (a) forming a first metal film pattern comprising a metal electrode wiring on a semiconductor substrate;
   (b) forming a first insulating film on the semiconductor substrate so as to cover the first metal film pattern;
   (c) etching the first insulating film using a dry etching process so as to expose an upper surface of the first metal film pattern and to leave a portion of the first insulating film remaining between the first metal film pattern and one or more neighboring metal film patterns, wherein, as a result of said etching, the upper surface of the first metal film pattern and the first insulating film have formed thereon a metal-containing deposit having a metal element; and
   (d) removing the metal-containing deposit having the metal element from each said remaining portion of the first insulating film left after said etching in said step (c).

2. The method for manufacturing a semiconductor device according to claim 1, wherein the metal-containing deposit is removed through radical etching in the step (d).

3. The method for manufacturing a semiconductor device according to claim 2, wherein the metal-containing deposit is removed through radical etching without using ion bombardment in said step (d).

4. The method for manufacturing a semiconductor device according to claim 3, wherein an etching gas contains a fluorine-based gas in the step (d).

5. The method for manufacturing a semiconductor device according to claim 4, wherein the etching gas further contains oxygen gas in the step (d).

6. The method for manufacturing a semiconductor device according to claim 5,
   wherein the first metal film pattern is a multilayer film having a titanium nitride film for a top layer, and
   radical etching is carried out using a mixed gas of carbon tetrafluoride gas and oxygen gas in the step (d).

7. The method for manufacturing a semiconductor device according to claim 1, wherein anisotropic etching is carried out to the first insulating film through ion assisted dry etching in the step (c).

8. The method for manufacturing a semiconductor device according to claim 1,
   wherein, after said step (d),
   (e) a nitridation process is carried out to the upper surface of the first metal film pattern.

9. The method for manufacturing a semiconductor device according to claim 8, wherein the nitridation process is carried out through a plasma treatment using a gas containing a nitrogen element.

10. The method for manufacturing a semiconductor device according to claim 9, wherein the nitridation process is carried out through a plasma treatment using ammonium gas.

11. The method for manufacturing a semiconductor device according to claim 9, wherein an oxygen plasma treatment is not carried out after the step (d) and before the step (e).

12. The method for manufacturing a semiconductor device according to claim 9, wherein the first metal film pattern is a multilayer film having a titanium nitride film for a top layer through the nitridation process.

13. The method for manufacturing a semiconductor device according to claim 1, wherein the first metal film pattern is a multilayer film having a first conductor film of which a main component is aluminum and a second conductor film for a top layer made of titanium nitride.

14. The method for manufacturing a semiconductor device according to claim 1, wherein the portion of the first insulating film remains as a sidewall insulating film on a sidewall of the first metal film pattern in the step (c).

15. The method for manufacturing a semiconductor device according to claim 1, wherein a space between the first metal film pattern and each said neighboring metal film pattern is filled with a remaining portion of the first insulating film in the step (c).

16. The method for manufacturing a semiconductor device according to claim 15, further comprising the step of:
   after the step (b) and before the step (c),
   (b1) removing an upper portion of the first insulating film through chemical mechanical polishing,
   wherein chemical mechanical polishing is finished before the upper surface of the first metal film pattern is exposed in the step (c).

17. The method for manufacturing a semiconductor device according to claim 1, further comprising the steps of:
   after the step (d),
   (f) forming a second insulating film on the semiconductor substrate that covers the first metal film pattern; and
   (g) forming a second metal film pattern on the second insulating film,
   wherein the second metal film pattern extends so as to cross an area above a region between the first metal film pattern and said neighboring metal film patterns.

18. The method for manufacturing a semiconductor device according to claim 1, further comprising the steps of:
   after said step (d),
   (e) forming a third insulating film on the semiconductor substrate so that the first metal film pattern is covered;
   (f) forming a sacrificial pattern for creating a cavity portion on the third insulating film;
   (g) forming a fourth insulating film on the third insulating film so that the sacrificial pattern is covered;
   (h) forming a second metal film pattern on the fourth insulating film;
   (i) forming a fifth insulating film on the fourth insulating film so that the second metal film pattern is covered;
   (j) creating a hole, from which a portion of the sacrificial pattern is exposed, in the fifth insulating film and the fourth insulating film; and
   (k) creating a cavity portion between the first metal film pattern and the second metal film pattern by selectively etching the sacrificial pattern through the hole.

19. The method for manufacturing a semiconductor device according to claim 18, wherein the second metal film pattern extends so as to cross above a region between the first metal film pattern and each said neighboring metal film pattern.

* * * * *